(12) United States Patent
Barker et al.

(10) Patent No.: US 6,908,710 B2
(45) Date of Patent: Jun. 21, 2005

(54) LITHIATED MOLYBDENUM OXIDE ACTIVE MATERIALS

(75) Inventors: Jeremy Barker, Shipton-Under-Wychwood (GB); M. Yazid Saidi, Henderson, NV (US); Jeffrey L. Swoyer, Henderson, NV (US)

(73) Assignee: Valence Technology, Inc., Henderson, NV (US)

(*) Notice: Subject to any disclaimer, the term of this patent is extended or adjusted under 35 U.S.C. 154(b) by 453 days.

(21) Appl. No.: 09/974,211

(22) Filed: Oct. 9, 2001

(65) Prior Publication Data

US 2004/0202937 A1 Oct. 14, 2004

(51) Int. Cl.⁷ .................................... H01H 4/36
(52) U.S. Cl. ..................... 429/231.9; 429/231.95
(58) Field of Search ............... 429/231.9, 231.95

(56) References Cited

U.S. PATENT DOCUMENTS

| | | | |
|---|---|---|---|
| 2,508,878 A | 5/1950 | Yates et al. ................... 75/4 |
| 2,570,232 A | 10/1951 | Hansgirg ....................... 75/67 |
| 3,865,745 A | 2/1975 | Block et al. .................. 264/82 |
| 4,177,060 A | 12/1979 | Tylko ........................... 75/10 R |
| 4,251,606 A | 2/1981 | Haering et al. ............. 429/194 |
| 4,652,506 A | * 3/1987 | Belanger et al. ........... 429/312 |
| 4,710,439 A | * 12/1987 | Tarascon ..................... 429/338 |
| 5,154,990 A | * 10/1992 | Plichta et al. .............. 429/319 |
| 5,240,794 A | 8/1993 | Thackeray et al. ......... 429/224 |
| 5,278,000 A | * 1/1994 | Huang et al. ................ 429/91 |
| 5,281,496 A | 1/1994 | Clarke ........................ 429/218 |
| 5,316,877 A | 5/1994 | Thackeray et al. ......... 429/197 |
| 5,378,560 A | 1/1995 | Tomiyama .................. 429/217 |
| 5,384,291 A | 1/1995 | Weimer et al. ............... 501/81 |
| 5,512,214 A | 4/1996 | Koksbang ................... 252/506 |
| 5,607,297 A | 3/1997 | Henley et al. ............... 432/99 |
| 5,683,835 A | 11/1997 | Bruce ......................... 429/224 |
| 5,705,689 A | * 1/1998 | Lee et al. .................... 562/873 |
| 5,803,947 A | 9/1998 | Engell et al. ............... 75/10.33 |

(Continued)

FOREIGN PATENT DOCUMENTS

| CA | 2064965 | 6/1997 |
|---|---|---|
| EP | 1049182 A2 | 11/2000 |
| EP | 1094533 A1 | 4/2001 |
| JP | 56162477 | 12/1981 |
| JP | 62176054 | 8/1987 |
| JP | 9134724 | 5/1997 |
| JP | 9134725 | 5/1997 |
| JP | 2001-08-5010 | 3/2001 |
| JP | 2001-11-0414 | 4/2001 |
| RU | 2038395 | 6/1995 |

OTHER PUBLICATIONS

James and Goodenough; Structure and Bonding in Li2MoO3 and Li2–xMoO3 (0≦x≦51.7); Journal of Solid State Chemistry 76, 87–96, 1988.

(Continued)

*Primary Examiner*—Sharidan Carrillo
(74) *Attorney, Agent, or Firm*—Michael D. Ross; Roger A. Williams; Cynthia S. Kovacevic

(57) ABSTRACT

The invention provides lithiated molybdenum oxides useful as cathode (positive electrode) active materials in rechargeable batteries, especially in lithium ion rechargeable batteries. In one aspect, the invention provides lithiated molybdenum oxides, some of which can be represented by nominal formulas $Li_xMoO_2$ where x ranges from 0.1 to 2, and $Li_4Mo_3O_8$. The crystal structure of the lithiated molybdenum oxides of the invention is characterized as being in a hexagonal space group with unit cell dimensions in a determined range. In a preferred embodiment, the lithiated molybdenum oxides of the invention can be formulated with known materials to provide electrodes for electrochemical cells. The invention also provides rechargeable batteries made by combining one or more such electrochemical cells.

15 Claims, 31 Drawing Sheets

U.S. PATENT DOCUMENTS

| | | | | |
|---|---|---|---|---|
| 6,085,015 | A | 7/2000 | Armand et al. | 385/140 |
| 6,346,348 | B1 * | 2/2002 | Nakajima et al. | 429/231.5 |
| 6,528,033 | B1 * | 3/2003 | Barker et al. | 423/306 |
| 6,730,281 | B2 * | 5/2004 | Barker et al. | 423/306 |
| 2003/0073003 | A1 * | 4/2003 | Barker et al. | 429/231.5 |

OTHER PUBLICATIONS

Huang, et al.; Lithium Insertion in Several Molybdenum (IV) Oxide Phases at Room Temperature; Journal of the Electrochemical Society; Solid–State Science and Technology; 408–412, 1988.

Aleandri and McCarley; Hexagonal LiMoO2: A Close–Packed Layered Structure with Infinite Mo–Mo–Bonded Sheets; Inorg. Chem. 1988, 27, 1041–1044.

Hibble, et al.; The True Structure and Metal—Metal–Bonded Framework of LiMolllO2 Determined from Total Neutron Scattering; Inorg. Chem. 1977, 36, 1749–1753.

Yebka, et al.; Electrochemical Behavior of Hydrated Molybdenum Oxides in Rechargeable Lithium Batteries; Ionics, 5, 236–243, 1999.

C. Julien; Electrochemical Properties of Disordered Cathode Materials; Ionics 2, 169–178, 1996.

Sanchez et al.; Electrochemical lithium insertion in two polymorphs of a reduced molybdenum oxide (Y and Y' Mo4O11); J Solid State Electrochem, 2000, 4: 210–215.

Terascon; A New Promising Cathode Material for Secondary Lithium Cells; Journal of the Electrochemical Society; vol. 134, No. 6, 1345–1351, 1987.

Huang, et al.; The Electrochemical Properties of Several Li–Mo–O Ternary Phases; 402–408, Department of Materials Science and Engineering, Stanford University, 402–408.

Shuk, et al.; Molybdenum Oxide Bronzes As pH Sensors; Short Communication; Pergamon; 2055–2058, 1995.

Julien, et al.; Lithium insertion in molybdenum and vanadium oxide films; Electrochemical Society Proceedings vol. 97–24; 862–873, 1998.

Shuk, et al.; New metal–oxide–type pH sensors; Solid State Ionics 86–88 (1996) (1115–1120).

Senoh, et al.; Lithium Insertion to Iron–substituted Molybdenum Trioxide; Trioxide; Denki Kagaku, 858–862; 62, No. 9 (1994).

Labat, et al.; Oxide based intercalation compounds for organic electrolyte rechargeable lithium cells; SAFT; Proc.–Electrochem. Soc. (1988), 88–6 (Proc. Symp. Primary Second. Ambient Temp. Lithium Batteries, 1987), 494–502.

Huang, et al.; A new positive electrode material based on lithium molybdenum oxide (Li4Mo5O12); Dep. Mater. Sci. Eng., Stanford University; Proc.–Electrochem. Soc. (1987), 87–1 (Proc. Symp. Lithium Batteries, 1986), 409–413.

Julien, et al.; Electrochemical studies of lithium insertion in MoO3 films; Solid State Ionics 53–56 (1992) 400–404, North–Holland.

Julien, et al.; The growth and electrical properties of metal–oxide thin films; lithium intercalation; Applied Surface Science 65/66 (1993) 325–330, North–Holland.

Drozdova, et al., A.N. article titled LixMo2–xO6 system as a battery cathode; Ukr. Khim. Zh. (Russ. Ed.) (1994), 60(2), 179–81. English Abstract included.

Hibble, et al.; Local Order and Metal—Metal Bonding in Li2MoO3, Li4Mo3O8, LiMoO2, and H2MoO3, Determined from EXAFS Studies; Inorg. Chem. 1995, 34, 500–508.

Gummow, et al., Lithium extraction from orthorhombic lithium manganese oxide and the phase transformation to spinel, Mater. Res. Bull. (1993), 28(12), 1249–56.

Gummow, et al., An investigation of spinel–related and orthorhombic LiMnO2 cathodes for rechargeable lithium batteries, J. Electrochem. Soc. (1994), 141(5), 1178–82.

Otsuka, et al., Hydrogen production from water by indium (III) oxide and potassium carbonate using graphite, active carbon and biomass as reductants, Chem. Lett. (1981), (3), 347–50.

Vasyutinskii, Appearance of emf. during ferric oxide reduction by carbon, Zh. Prikl. Khim. (1973), 46(4), 779–82 (Abstract).

Gilchrist, Extraction Metallurgy, Pergamon Press, (1980), pp. 160–173.

* cited by examiner

LiMoO₂ prepared from MoO₃/LiCO₃/carbon

LiMoO₂ prepared from MoO₃/LiCO₃/carbon

MoO₂ prepared from MoO₃/carbon

MoO₂ prepared from MoO₃/25% stoichiometric excess carbon

MoO$_2$ prepared from MoO$_3$/50% stoichiometric excess carbon

MoO$_2$ prepared from MoO$_3$/100% stoichiometric excess carbon $LiMoO_2$ prepared from $MoO_3/LiCO_3$/25% stoichiometric excess carbon LiMoO₂ prepared from MoO₃/LiCO₃/100% stoichiometric excess carbon LiMoO2 prepared from MoO3/LiCO3/25% stoichiometric excess carbon LiMoO$_2$ prepared from MoO$_3$/LiCO$_3$/100% stoichiometric excess carbon LiMoO2 prepared from MoO3/LiCO3/100% stoichiometric excess carbon Li₀.₇₄MoO₂ prepared from MoO₃/LiCO₃/carbon Li$_4$Mo$_3$O$_8$ prepared from MoO$_3$/LiCO$_3$ LiMoO₂ prepared from Li₂MoO₄/Mo metal 1st cycle of LiMoO₂ vs. MCMB-2528

1st cycle of LiMoO₂ vs. MCMB-2528

1st cycle of Li$_4$Mo$_3$O$_8$ vs. MCMB-2528

1st cycle of Li$_4$Mo$_3$O$_8$ vs. MCMB-2528

# LITHIATED MOLYBDENUM OXIDE ACTIVE MATERIALS

FIELD OF THE INVENTION

The present invention relates to improved materials usable as electrode active materials and to their preparation.

BACKGROUND OF THE INVENTION

Lithium batteries are prepared from one or more lithium electrochemical cells containing electrochemically active materials. Such cells typically include an anode (negative electrode), a cathode (positive electrode), and an electrolyte interposed between spaced apart positive and negative electrodes. Batteries with anodes of metallic lithium and containing metal chalcogenide cathode active material are known. The electrolyte typically comprises a salt of lithium dissolved in one or more solvents, typically aprotic organic solvents. By convention, during discharge of the cell, the negative electrode of the cell is defined as the anode. Cells having a metallic lithium anode and metal chalcogenide cathode are charged in an initial condition. During discharge, lithium ions from the metallic anode pass through the liquid electrolyte to the active material of the cathode whereupon they release electrical energy to an external circuit.

It has recently been suggested to replace the lithium metal anode with an insertion anode, such as a lithium metal chalcogenide or lithium metal oxide. Carbon anodes, such as coke and graphite, are also insertion materials. Such negative electrodes are used with lithium-containing insertion cathodes, in order to form an electroactive couple in a cell. In order to be used to deliver electrochemical energy, such cells must be charged in order to transfer lithium to the anode from the lithium-containing cathode. During discharge the lithium is transferred from the anode back to the cathode. During a subsequent recharge, the lithium is transferred back to the anode where it re-inserts. Upon subsequent charge and discharge, lithium ions are transported between the electrodes. Such rechargeable batteries, having no free metallic species are called rechargeable ion batteries or rocking chair batteries. See U.S. Pat. Nos. 5,418,090; 4,464,447; 4,194,062; and 5,130,211.

Known positive electrode active materials include $LiCoO_2$, $LiMn_2O_4$, and $LiNiO_2$. The cobalt compounds are relatively expensive and the nickel compounds are difficult to synthesize. A relatively economical positive electrode is $LiMn_2O_4$, for which methods of synthesis are known. The lithium cobalt oxide, the lithium manganese oxide, and the lithium nickel oxide have a common disadvantage in that the charge capacity of a cell comprising such cathodes may suffer a significant loss in capacity. That is, the initial specific capacity available (milliamp hours/gram) from $LiMn_2O_4$, $LiNiO_2$, and $LiCoO_2$ is less than the theoretical specific capacity because significantly less than 1 atomic unit of lithium engages in the electrochemical reaction. Such an initial capacity value is significantly diminished during the first cycle operation and such capacity further diminish in successive cycles of operation. For $LiNiO_2$ and $LiCoO_2$ only about 0.5 atomic units of lithium is reversibly cycled during cell operation. Many attempts have been made to reduce capacity fading, for example, as described in U.S. Pat. No. 4,828,834 by Nagaura et al. However, the presently known and commonly used, alkali transition metal oxide compounds suffer from relatively low capacity. Therefore, there remains the difficulty of obtaining a lithium-containing electrode material having acceptable capacity without disadvantage of significant capacity loss when used in a cell.

Lithiated molybdenum oxides of the present invention have not been used in lithium ion batteries. Huang et al. in J. Electrochem. Soc vol. 135, page 411 (1988) describe lithium insertion in $MoO_2$ to make a material characterized as $LiMoO_2$. However, the structure of the material is different from that of the lithiated molybdenum oxides produced by the reduction processes of the invention. Tarascon in U.S. Pat. No. 4,710,439 discloses for use in a lithium metal battery a cathode material of nominal formula $Li_xMo_2O_4$ where x ranges from 0.3 to 2. The materials of Tarascon are prepared by ion exchange from a sodium material and have a monoclinic structure. In U.S. Pat. No. 4,251,606 to Haering et al., a battery is described that contains an anode of lithium metal and a cathode made of $MoO_2$. During discharge, a portion x of lithium atoms can insert into the lattice of the cathode active material to form a substance with nominal formula $Li_xMoO_2$, which, as in Huang, has a lattice structure like that of $MoO_2$.

SUMMARY OF THE INVENTION

The invention provides lithiated molybdenum oxides useful as cathode (positive electrode) active materials in rechargeable batteries, especially in lithium ion rechargeable batteries. In one aspect, the invention provides lithiated molybdenum oxides, some of which can be represented by nominal formulas $Li_xMoO_2$ where x ranges from 0.1 to 2, and $Li_4Mo_3O_8$. The crystal structure of the lithiated molybdenum oxides of the invention can be characterized as being in a hexagonal space group with unit cell dimensions in a determined range.

In one aspect of the invention methods are provided for producing the lithiated molybdenum oxides. The materials are synthesized by reacting a lithium source and a source of molybdenum in an oxidation state of +4 to +6, in the presence of a carbon reductant. During synthesis of the lithiated molybdenum oxides of the invention, molybdenum is reduced and carbon is oxidized, so that the molybdenum in the reaction product is in a lower oxidation state than it was in the starting material molybdenum source. The active materials of the invention contain molybdenum in an oxidation state of from +2 to less than +6. It should be noted too that the average oxidation state of molybdenum within a given compound can take on non-integer values within that range.

In a preferred embodiment, the lithiated molybdenum oxides of the invention can be formulated with known materials to provide electrodes for electrochemical cells. The invention also provides rechargeable batteries made by combining one or more such electrochemical cells.

DETAILED DESCRIPTION OF THE INVENTION

Figure 1:
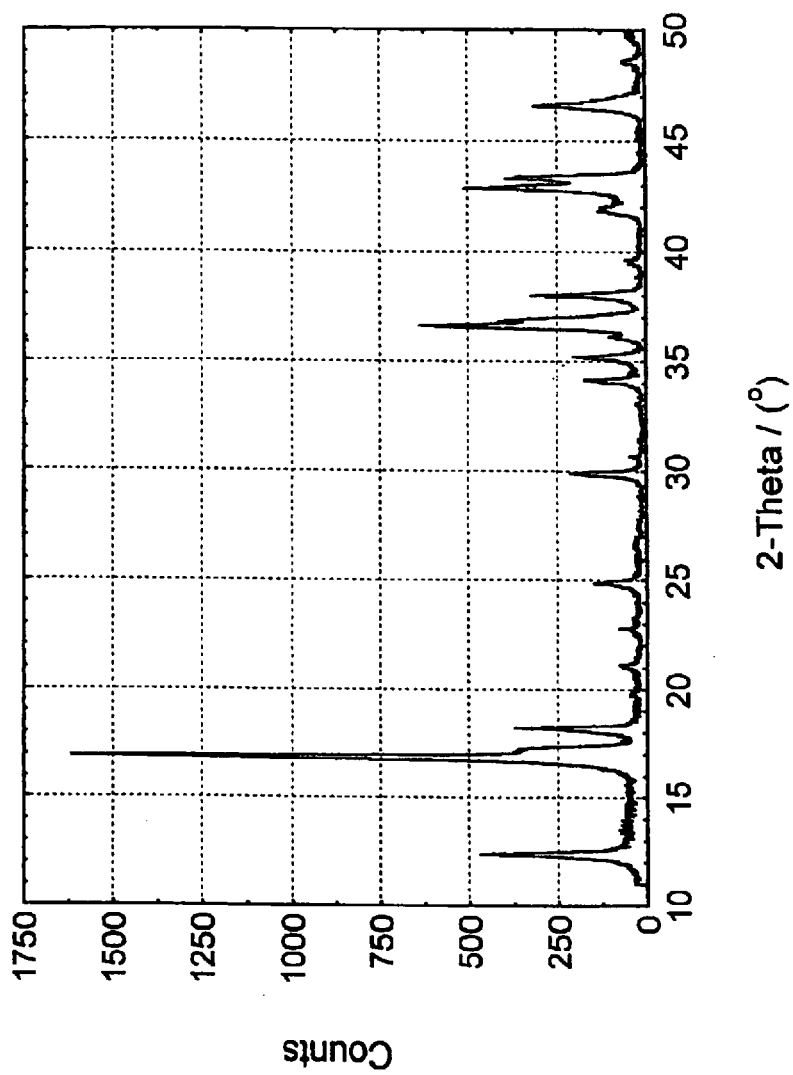
FIG. 1 is x-ray diffraction data of $LiMoO_2$ made from $MoO_3/Li_2CO_3$/carbon.

The lithiated molybdenum oxides of the invention can be represented by the empirical formula $$Li_a(Mo^{+d})_bO_c \quad (I)$$

The oxidation state d of molybdenum in the lithiated molybdenum oxide can be from +2 to less than +6, desirably +3 to +5 and preferably +3 to +4. The variables a, b, c, and d satisfy the equation $$a+bd=2c$$

so as to achieve charge neutrality.

In one aspect of the invention, the active materials are lithiated molybdenum oxides with a common crystal structure, representing a series of related compounds sharing a similar lattice structure, where differences in empirical composition are accommodated in the structure by varying levels of population of anionic and cationic sites. The common crystal structure is demonstrated by the x-ray diffraction pattern of a number of the materials, such as described below in FIGS. 1, 10, 11, 17, 18, and 19. All show x-ray diffraction consistent with a structure having unit cell dimensions as illustrated in Table 1 based on a hexagonal space group. It is also possible to fit the x-ray diffraction patterns to a common monoclinic space group C2/m. The empirical representation of the active materials of the invention as given in Formula I can be "normalized" to two oxygens. That is, the lithiated molybdenum oxides of the invention can be represented by a structure $Li_{a'}(Mo^{+d})_{b'}O_2$ with (a'+b'd)=4. The relative values of a' and b' can be thought of as representing a fractional population of lattice sites in the crystal structure of an extended array.

Within the broad range of compounds generally represented by formula I, a number of compounds correspond to lithiated molybdenum oxides having a and b in simple ratios and c "normalized" to 2. For example, when a and b are both equal to 1, the lithiated molybdenum oxide is $LiMoO_2$, with molybdenum in an oxidation state of +3. When x is 1 and y is ¾, the formula represents compounds $LiMo_{3/4}O_2$. This compound is more commonly written in least common multiple form as $Li_4Mo_3O_8$, with molybdenum in an oxidation state of +4.

As noted above, the variables a, b, and d can also take on non-integer values, or fractional values that do not reduce as readily to a least common multiple form. In one embodiment, when c is "normalized" to 2, the active materials of the invention can be expressed by the formula $Li_xMoO_2$, where x is greater than zero and less than 2. In a preferred embodiment, x is from about 0.3 to about 1.2, preferably from about 0.3 to about 1, while the average oxidation state of molybdenum is correspondingly from about 3 to about 3.7. For example, the synthesis of $Li_{0.74}MoO_2$ is described below, in which a is 0.74, and the oxidation state d of Mo is +3.26. Similarly $Li_{0.85}MoO_2$ is synthesized, in which a is 0.85 and d is +3.15. As described below, the invention provides a general method for synthesis of $Li_a(Mo^{+d})_bO_c$ (or $Li_{a'}Mo_{b'}O_2$) by varying the molar amounts of lithium, molybdenum and optional reductants, the values of a, b, c, d, a', and b' being constrained as noted above.

In another aspect, the active materials are reaction products of molybdenum compound and reducing carbon, containing carbon intimately dispersed through the reaction product. In this aspect, the active materials are prepared by reacting molybdenum compounds, lithium compounds, and at least a slight excess of reducing carbon. The reducing carbon forms nucleation sites for the formation of the reduced molybdenum compound during the reaction. After reaction, excess reducing carbon, usually in the form of elemental carbon, is dispersed throughout the reaction product.

The lithiated molybdenum oxides of the invention can be prepared with a carbothermal preparation method, using as starting materials a source of lithium and a source of molybdenum. Examples of lithium source are given below and include, without limitation, lithium acetate, lithium hydroxide, lithium nitrate, lithium oxalate, lithium oxide, lithium phosphate, lithium dihydrogen phosphate, and lithium carbonate, as well as hydrates of the above. Mixtures of lithium sources can also be used. Examples of molybdenum source are discussed below and include, without limitation, molybdenum dioxide, molybdenum trioxide, and molybdate compounds. Preferred molybdate compounds, used as the molybdenum source, include the alkali metal salts, such as sodium, lithium, and potassium, with lithium molybdate being preferred.

In the carbothermal preparation method, the starting materials are mixed together with reducing carbon, which is included in an amount sufficient to reduce the metal ion of one or more of the metal-containing starting materials. The reducing carbon in a preferred embodiment is elemental carbon, which is available as a powder that can be intimately mixed with the other powdered starting materials. Reducing carbon may also be supplied by a number of other organic materials that can decompose on heating to form an elemental carbon material that can take part in the carbothermal reaction. Such organic materials include without limitation, glycerol, mineral oils, cokes, coal tars, starch and other organic polymers that can form carbon material in situ on heating. In a preferred embodiment, the source of reducing carbon undergoes decomposition to elemental carbon in situ at temperatures below which the other starting materials react. The carbothermal conditions are set such as to ensure the metal ion does not undergo full reduction to the elemental state. Excess quantities of one or more starting materials other than the reducing carbon may be used to enhance product quality. For example, a 5% to 10% excess may be used. The carbon starting material may also be used in excess. When the carbon is used in stoichiometric excess over that required to react as reductant with the molybdenum source, an amount of carbon, remaining after the reaction, functions as a conductive constituent in the ultimate electrode formulation. This is considered advantageous for the further reason that such remaining carbon will in general be intimately mixed with the product active material. Accordingly, excess carbon is preferred for use in the process, and may be present in a stoichiometric excess amount of 100% or greater. The carbon present during compound formation is thought to be intimately dispersed throughout the precursor and product. This provides many advantages, including the enhanced conductivity of the product. The presence of carbon particles in the starting materials is also thought to provide nucleation sites for the production of the product crystals.

The starting materials are mixed and then reacted together where the reaction is initiated by heat and is preferably conducted in a non-oxidizing, inert atmosphere, whereby the lithium and molybdenum combine to form the lithiated molybdenum oxide product. Before reacting the compounds, the particles are mixed or intermingled to form an essentially homogeneous powder mixture of the precursors. In one aspect, the precursor powders are dry-mixed using a ball mill and mixing media such as zirconia. Then the mixed powders are pressed into pellets. In another aspect, the precursor powders are mixed with a binder. The binder is selected so as to not inhibit reaction between particles of the powders. Therefore, preferred binders decompose or evaporate at a temperature less than the reaction temperature. Examples include, without limitation, mineral oils, glycerol, coal tars, cokes, starch, and other organic polymers that decompose to form a carbon residue before the reaction starts. In some embodiments, the binder used may be the same material used as the source of reducing carbon, as discussed above. In other embodiments, elemental carbon is used as a source of reducing carbon, and a binder is used in addition. In still another aspect, intermingling can be accomplished by forming a wet mixture using a volatile solvent and then the intermingled particles are pressed together in pellet form to provide good grain-to-grain contact.

Although it is desired that the precursor compounds be present in a proportion which provides the stated general formula of the product, the lithium compound may be present in an excess amount on the order of 5 percent excess lithium compared to a stoichiometric mixture of the precursors. As noted earlier, the reducing carbon may be present in stoichiometric excess of 100% or greater. A number of lithium compounds are available as precursors, such, without limitation, as lithium acetate ($LiOCOCH_3$), lithium hydroxide, lithium nitrate ($LiNO_3$), lithium oxalate ($Li_2C_2O_4$), lithium oxide ($Li_2O$), lithium phosphate ($Li_3PO_4$), lithium dihydrogen phosphate ($LiH_2PO_4$), and lithium carbonate ($Li_2CO_3$). Preferred lithium sources include those having a melting point higher than the temperature of reaction. In such cases, the lithium source tends to decompose in the presence of the other precursors and/or to effectively react with the other precursors before melting. For example, lithium carbonate has a melting point over 600° C. and commonly reacts with the other precursors before melting.

The method of the invention is able to be conducted as an economical carbothermal-based process with a wide variety of precursors and over a relatively broad temperature range. The reaction temperature for reduction depends on the metal-oxide thermodynamics, for example, as described in Ellingham diagrams showing the $\Delta G$ (Gibbs Free Energy Change) versus T (temperature) relationship. As described earlier, it is desirable to conduct the reaction at a temperature where the lithium compound reacts before melting. In general, the temperature should desirably be about 400° C. or greater, preferably 450° C. or greater, and more preferably 500° C. or greater. Higher temperatures are preferred because the reaction generally will normally proceed at a faster rate at higher temperatures. The various reactions involve production of CO or $CO_2$ as an effluent gas. The equilibrium at higher temperature favors CO formation.

Generally, higher temperature reactions produce predominantly CO effluent while lower temperatures result in relatively more $CO_2$ formation from the starting material carbon. At higher temperatures where CO formation is favored, the stoichiometry requires more carbon be used than the case where $CO_2$ is produced. The C to $CO_2$ reaction involves an increase in carbon oxidation state of +4 (from 0 to 4) and the C to CO reaction involves an increase in carbon oxidation state of +2 (from ground state zero to 2). Here, higher temperature generally refers to a range above about 650° C. While there is not believed to be a theoretical upper limit, it is thought that temperatures higher than 1200° C. are not needed. Also, for a given reaction with a given amount of carbon reductant, the higher the temperature the stronger the reducing conditions.

In one aspect, the method of the invention utilizes the reducing capabilities of carbon in a controlled manner to produce desired products having structure and lithium content suitable for electrode active materials. The method of the invention makes it possible to produce products containing lithium, metal and oxygen in an economical and convenient process. The ability to lithiate precursors, and change the oxidation state of a metal without causing abstraction of oxygen from a precursor is advantageous. The advantages are at least in part achieved by the reductant, carbon, having an oxide whose free energy of formation becomes more negative as temperature increases. Such oxide of carbon is more stable at high temperature than at low temperature. This feature is used to produce products having one or more metal ions in a reduced oxidation state relative to the precursor metal ion oxidation state. The method utilizes an effective combination of quantity of carbon, time and temperature to produce new products and to produce known products in a new way.

Referring back to the discussion of temperature, at about 700° C. both the carbon to carbon monoxide and the carbon to carbon dioxide reactions are occurring. At closer to 600° C. the C to $CO_2$ reaction is the dominant reaction. At closer to 800° C. the C to CO reaction is dominant. Since the reducing effect of the C to $CO_2$ reaction is greater, the result is that less carbon is needed per atomic unit of metal to be reduced. In the case of carbon to carbon monoxide, each atomic unit of carbon is oxidized from ground state zero to plus 2. Thus, for each atomic unit of metal ion (M) which is being reduced by one oxidation state, one half atomic unit of carbon is required. In the case of the carbon to carbon dioxide reaction, one quarter atomic unit of carbon is stoichiometrically required for each atomic unit of metal ion (M) which is reduced by one oxidation state, because carbon goes from ground state zero to a plus 4 oxidation state. These same relationships apply for each such metal ion being reduced and for each unit reduction in oxidation state desired.

It is preferred to heat the starting materials at a ramp rate of a fraction of a degree to 10° C. per minute and preferably about 2° C. per minute. Once the desired reaction temperature is attained, the reactants (starting materials) may be held at the reaction temperature for several hours. Although the reaction may be carried out in oxygen or air, the heating is preferably conducted under an essentially non-oxidizing atmosphere. The atmosphere is preferably essentially non-oxidizing so as not to interfere with the reduction reactions taking place. An essentially non-oxidizing atmosphere can be achieved through the use of vacuum or inert gases such as argon. Although some oxidizing gas (such as oxygen or air) may be present, it should not be at so great a concentration that it interferes with the carbothermal reduction or lowers the quality of the reaction product. It is believed that any oxidizing gas present will tend to react with the carbon and lower the availability of the carbon for participation in the reaction. To some extent, such a contingency can be anticipated and accommodated by providing an appropriate excess of carbon as a starting material. Nevertheless, it is generally preferred to carry out the carbothermal reduction in an atmosphere containing as little oxidizing gas as practical.

Advantageously, a reducing atmosphere is not required, although it may be used if desired. For example, the reaction may be carried out in the presence of reducing gases. Non-limiting examples of reducing gases include hydrogen, methane, ammonia, and carbon monoxide. Reforming gas, which is a combination of hydrogen in an inert gas such as argon or nitrogen may also be used.

After reaction, the products are preferably cooled from the elevated temperature to ambient (room) temperature (i.e., 10° C. to 40° C.). Desirably, the cooling occurs at a rate similar to the earlier ramp rate, and preferably 2° C./minute cooling. Such cooling rate has been found to be adequate to achieve the desired structure of the final product. It is also possible to quench the products at a cooling rate on the order of about 100° C./minute. In some instances, such rapid cooling (quench) may be preferred.

Active materials of the invention having molybdenum in the +4 oxidation state can be made in a single step without reduction by reacting a lithium source with a molybdenum source having a oxidation state of +4. See Examples 7 and 10 below, wherein lithium carbonate and molybdenum dioxide are reacted to form $Li_4Mo_3O_8$ with molybdenum in a +4 oxidation state. A molybdenum source with an oxidation state of +4 may also be used in a carbothermal reduction reaction to produce active materials having molybdenum in an oxidation state of less than +4. Examples 4 and 5 illustrate such a process, with molybdenum dioxide used as a molybdenum source.

In a preferred embodiment, the molybdenum source that is used to react with a lithium source is itself prepared from a second molybdenum source by carbothermal reduction. Examples 4, 5, and 7 illustrate a two-step process for making the active materials of the invention, wherein in a first step a second molybdenum source (represented in the Examples by molybdenum trioxide or $MoO_3$) is reduced in the presence of elemental carbon to form molybdenum dioxide ($MoO_2$). In a second step, the molybdenum dioxide from carbothermal reduction of the second molybdenum source can be further reacted with a lithium source either with (Examples 4 and 5) or without (Examples 7 and 10) a reductant comprising elemental carbon.

Molybdenum dioxide may also be produced from molybdenum trioxide by reacting with molybdenum metal as illustrated in Example 10. Whether molybdenum trioxide is to be reduced by molybdenum metal or by a carbon reductant, it is possible to use an excess of the reductant molybdenum or carbon respectively. In the case where carbon is the reductant, the excess carbon left at the end of the reaction is incorporated into the active material produced by subsequent reaction of the molybdenum dioxide with a lithium source. In such a situation, the active material containing excess carbon is compatible with the electrode composition which itself contains further carbonaceous material. Similarly, when molybdenum oxide is produced with an excess of molybdenum metal as reductant, the excess molybdenum metal is carried over into the active material produced by subsequent reaction of the molybdenum dioxide with a lithium source. The presence of excess molybdenum in the active material of the invention may be disadvantageous depending on the other aspects of the batteries made with the active material.

The lithiated molybdenum oxides of the invention can also be produced by reducing a molybdate with molybdenum metal. Such a reaction is illustrated in Example 11 where lithium molybdate, having molybdenum in a +6 valence state, is reduced with molybdenum metal to form an active material having molybdenum in a +4 valence state. As with reduction of molybdenum trioxide, the molybdenum metal in the reduction of lithium molybdate may be present in excess. As before, such excess is carried over into the active material produced by the reaction, which may as discussed above be disadvantageous depending on the characteristics of the battery. Active materials with molybdenum in the +3 valence state may also be made by reduction of molybdates with molybdenum metal (Example 8).

The lithiated molybdenum oxide active materials of the invention may also be produced by reacting a lithium source with a molybdenum source as discussed above, in the presence of a reductant comprising molybdenum metal. Such a scheme is illustrated in Example 9, wherein a general procedure is given for synthesis of active materials of empirical formula $Li_xMoO_2$. The molybdenum metal acts as a reductant and in a way analogous to the role of elemental carbon in the processes discussed above. In general, a source of lithium and a source of molybdenum is reacted in an appropriate stoichiometric amount to produce active materials made of lithiated molybdenum oxides according to Formula 1 given above. The stoichiometric amount of molybdenum metal used in the reaction is chosen to provide reducing power for the amount of molybdenum present in the molybdenum source. During the reaction, molybdenum metal is oxidized while $Mo^{+n}$ is reduced. Both types of precursor molybdenum end up in the reaction product. As with the other reductions with molybdenum metal and with elemental carbons described above, the molybdenum metal reductant may be used in a stoichiometric excess.

Typical cell configurations will now be described with reference to FIGS. 30 and 31; and such battery or cell utilizes the novel material of the invention. Note that the preferred cell arrangement described here is illustrative and the invention is not limited thereby. Experiments are often performed, based on full and half cell arrangements, as per the following description. For test purposes, test cells are often fabricated using lithium metal electrodes. When forming cells for use as batteries, it is preferred to use an insertion positive electrode as per the invention and a graphitic carbon negative electrode.

Figure 30:
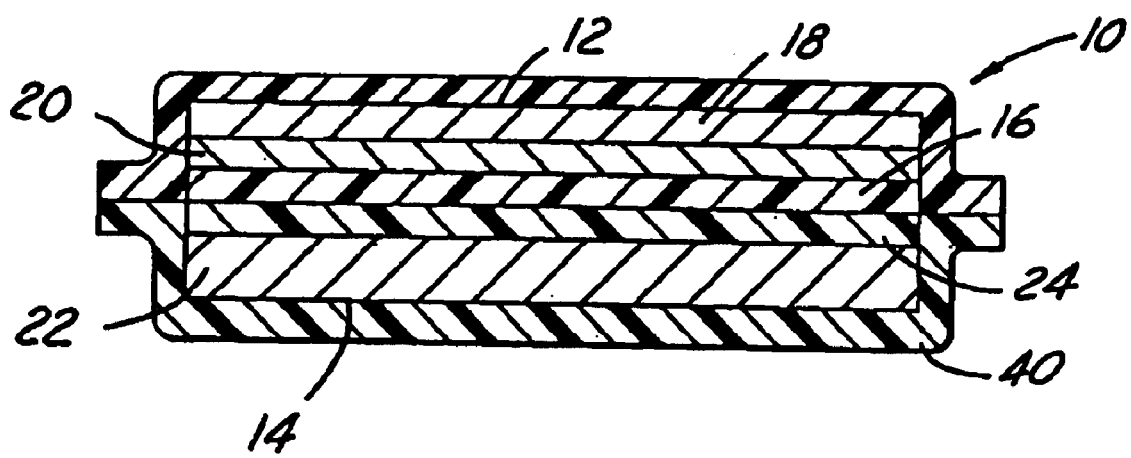
FIG. 30 is a diagrammatic representation of a typical laminated lithium-ion battery cell structure.

A typical laminated battery cell structure 10 is depicted in FIG. 30. It comprises a negative electrode side 12, a positive electrode side 14, and an electrolyte/separator 16 there between. Negative electrode side 12 includes current collector 18, and positive electrode side 14 includes current collector 22. A copper collector foil 18, preferably in the form of an open mesh grid, upon which is laid a negative electrode membrane 20 comprising an insertion material such as carbon or graphite or low-voltage lithium insertion compound, dispersed in a polymeric binder matrix. An electrolyte/separator film 16 membrane is preferably a plasticized copolymer. This electrolyte/separator preferably comprises a polymeric separator and a suitable electrolyte for ion transport. The electrolyte/separator is positioned upon the electrode element and is covered with a positive electrode membrane 24 comprising a composition of a finely divided lithium insertion compound in a polymeric binder matrix. An aluminum collector foil or grid 22 completes the assembly. Protective bagging material 40 covers the cell and prevents infiltration of air and moisture.

Figure 31:
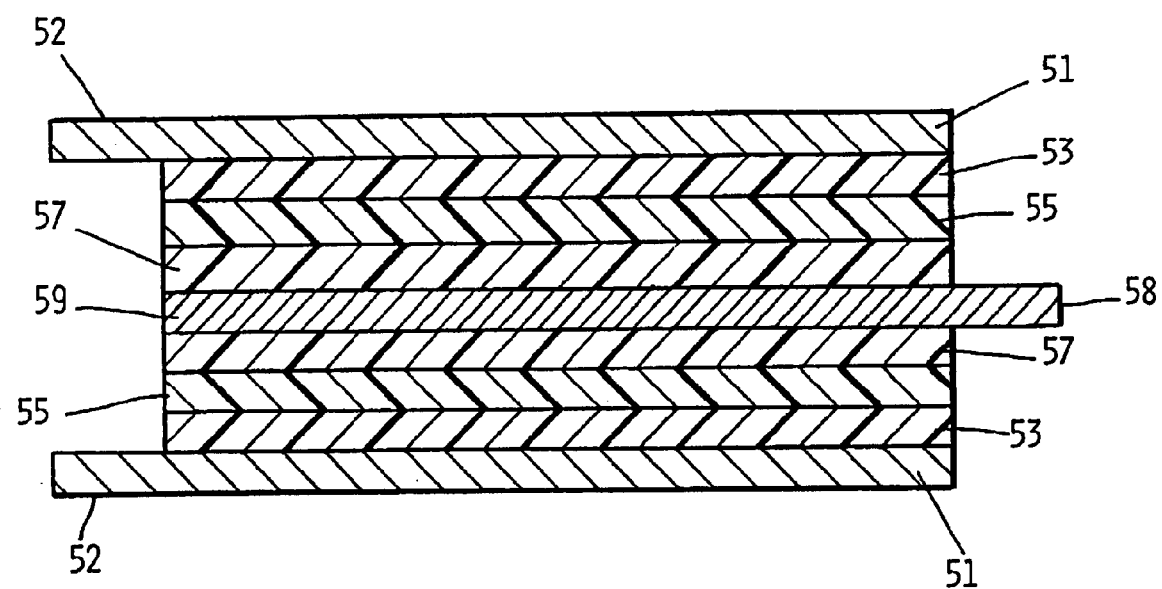
FIG. 31 is a diagrammatic representation of a typical multi-cell battery cell structure.

In another embodiment, a multi-cell battery configuration as per FIG. 31 is prepared with copper current collector 51, negative electrode 53, electrolyte/separator 55, positive electrode 57, and aluminum current collector 59. Tabs 52 and 58 of the current collector elements form respective terminals for the battery structure. As used herein, the terms "cell" and "battery" refer to an individual cell comprising anode/electrolyte/cathode and also refer to a multi-cell arrangement in a stack.

The relative weight proportions of the components of the positive electrode are generally: 50–90% by weight active material; 5–30% carbon black as the electric conductive diluent; and 3–20% binder chosen to hold all particulate materials in contact with one another without degrading ionic conductivity. Stated ranges are not critical, and the amount of active material in an electrode may range from about 25 to about 95 weight percent. The negative electrode comprises about 50–95% by weight of a preferred graphite, with the balance constituted by a binder. A typical electrolyte separator film comprises approximately two parts polymer for every one part of a preferred fumed silica. The conductive solvent comprises any number of suitable solvents and salts. Desirable solvents and salts are described in U.S. Pat. Nos. 5,643,695 and 5,418,091. One example is a mixture of $EC:DMC:LiPF_6$ in a weight ratio of about 60:30:10. This corresponds approximately to a 1M solution of $LiPF_6$ in an EC/DMC mixture.

Solvents are selected to be used individually or in mixtures, and include, without limitation, dimethyl carbonate (DMC), diethylcarbonate (DEC), dipropylcarbonate (DPC), ethylmethylcarbonate (EMC), ethylene carbonate (EC), propylene carbonate (PC), butylene carbonate, lactones, esters, glymes, sulfoxides, sulfonanes, etc. Mixtures of solvents include, without limitation, EC/DMC, EC/DEC, EC/DPC and EC/EMC. The salt content ranges from 5% to 65% by weight, preferably from 8% to 35% by weight.

Separator membrane element 16 is generally polymeric and prepared from a composition comprising a copolymer. A preferred composition is a 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organize compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are particularly suitable. Inorganic filler adjuncts, such as fumed alumina or silanized fumed silica, may be used to enhance the physical strength and melt viscosity of a separator membrane and, in some compositions, to increase the subsequent level of electrolyte solution absorption.

Those skilled in the art will understand that any number of methods are used to form films from the casting solution using conventional meter bar or doctor blade apparatus. It is usually sufficient to air-dry the films at moderate temperature to yield self-supporting films of copolymer composition. Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

In a non-limiting example of the construction of one type of lithium-ion battery, a current collector layer of aluminum foil or grid is overlaid with a positive electrode film, or membrane, separately prepared as a coated layer of the dispersion of insertion electrode composition. The electrode composition generally contains a powder of the active material of the invention in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF/HFP copolymer matrix solution is similarly overlaid on the separator membrane layer. A copper current collector foil or grid is ladi upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Examples of forming cells containing metallic lithium anode, insertion electrodes, solid electrolytes and liquid electrolytes can be found in U.S. Pat. Nos. 4,668,595; 4,830,939; 4,935,317; 4,990,413, 4,792,504, 5,037,712; 5,262,253; 5,300,373; 5,435,054; 5,463,179; 5,399,447; 5,482,795 and 5,411,820; each of which is incorporated herein by reference in its entirety. Note that the older generation of cells contained organic polymeric and inorganic electrolyte matrix materials, with the polymeric being most preferred. The polyethylene oxide of U.S. Pat. No. 5,411,820 is an example. More modern examples are the VdF:HFP polymeric matrix. Examples of casting, lamination and formation of cells using VdF:HFP are as described in U.S. Pat. Nos. 5,418,091; 5,460,904; 5,456,000; and 5,540,741; assigned to Valence Technology, Inc., each of which is incorporated herein by reference in its entirety.

As described earlier, the electrochemical cell operated as per the invention, may be prepared in a variety of ways. In one embodiment, the negative electrode may be metallic lithium. In more desirable embodiments, the negative electrode is an insertion active material, such as, metal oxides and graphite. When a metal oxide active material is used, the components of the electrode are the metal oxide, electrically conductive carbon, and binder, in proportions similar to that described above for the positive electrode. In a preferred embodiment, the negative electrode active material is graphite particles. For test purposes, test cells are often fabricated using lithium metal electrodes. When forming cells for use as batteries, it is preferred to use an insertion metal oxide positive electrode and a graphitic carbon negative electrode. Various methods for fabricating electrochemical cells and batteries and for forming electrode components are described herein. The invention is not, however, limited by an particular fabrication method.

The invention has been described above in relation to preferred embodiments. Further non-limiting examples of the lithiated molybdenum oxides of the invention are given in the examples that follow.

EXAMPLES

The following Examples give the general reaction scheme and conditions used to make the active materials of the invention. Specific examples of synthetic materials are discussed below in relation to the data shown in the Figures.

Example 1

Direct Carbothermal Reduction of $MoO_3$ using $Li_2CO_3$ as Lithium Source to Produce $LiMoO_2$:

Reaction assumes C→CO reaction (i.e. >650° C.)

Reaction:

$$0.5\ Li_2CO_3 + 1.0\ MoO_3 + 1.5\ C \rightarrow LiMoO_2 + 0.5\ CO_2 + 1.5\ CO$$

0.5 g-mol $Li_2CO_3$ is equivalent to 36.95 g
1.0 g-mol $MoO_3$ is equivalent to 143.94 g
1.5 g-mol C is equivalent to 18.00 g
An excess of carbon—typically 0–100% mass excess may be used.

Method:
(a) Pre-mix powders in molar proportions as shown
(b) Pelletize powder mixture
(c) Heat pellet at rate of 1–5° C./minute to 650–950° C. in inert atmosphere ($N_2$, Ar or vacuum)
(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive
(h) Powderize
(i) Optionally, re-pelletize and repeat steps (c) through (h) above

Example 2

Direct Carbothermal Reduction of $MoO_3$ using $LiOH.H_2O$ as Lithium Source:

Reaction assumes C→CO reaction (i.e. >650° C.)

Reaction:

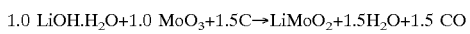
$$1.0\ LiOH.H_2O + 1.0\ MoO_3 + 1.5\ C \rightarrow LiMoO_2 + 1.5\ H_2O + 1.5\ CO$$

1.0 g-mol $LiOH.H_2O$ is equivalent to 41.96 g
1.0 g-mol $MoO_3$ is equivalent to 143.94 g
1.5 g-mol C is equivalent to 18.00 g
An excess of carbon typically 0–100% mass excess, may be used.

Method:
(a) Pre-mix powders in molar proportions as shown
(b) Pelletize powder mixture
(c) Heat pellet at rate of 1–5° C./minute to 650–950° C. in inert atmosphere ($N_2$, Ar or vacuum)
(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above.

Example 3

Direct Carbothermal Reduction of $MoO_3$ using $Li_2CO_3$ as Lithium Source to Produce $Li_xMoO_2$ (0<x<2). For Example, to Make $Li_{0.74}MoO_2$, $Li_{0.85}MoO_2$ etc.

Reaction assumes C→CO reaction (i.e. >650° C.)

General Reaction:

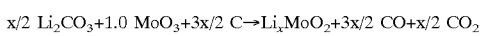
$$x/2\ Li_2CO_3 + 1.0\ MoO_3 + 3x/2\ C \rightarrow Li_xMoO_2 + 3x/2\ CO + x/2\ CO_2$$

x/2 g-mol $Li_2CO_3$ is equivalent to (x/2 multiplied by 73.89) g
1.0 g-mol $MoO_3$ is equivalent to 143.94 g
3x/2 g-mol C is equivalent to (3x/2 multiplied by 12.00) g
An excess of carbon—typically 0–100% mass excess may be used.

Method:
(a) Pre-mix powders in molar proportions as shown
(b) Pelletize powder mixture
(c) Heat pellet at rate of 1–5° C./minute to 650–950° C. in inert atmosphere ($N_2$, Ar or vacuum)

(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above

Example 4

Carbothermal Reduction of $MoO_3$ to $MoO_2$ Followed by Carbothermal Reduction of $MoO_2$ using $Li_2CO_3$ as the Lithium Source to Produce $LiMoO_2$ Step 1: Production of $MoO_2$ Reaction assumes C→CO reaction (i.e. >650° C.)

This reaction forms the first step of several other preparative examples.
Reaction:

$$1.0\ MoO_3 + 1.0\ C \rightarrow MoO_2 + 1.0\ CO$$

1.0 g-mol $MoO_3$ is equivalent to 143.94 g
1.0 g-mol C is equivalent to 12.00 g
An excess of carbon—typically 0–100% mass excess may be used.
Method:
(a) Pre-mix powders in molar proportions as shown
(b) Pelletize powder mixture
(c) Heat the pellet at a rate of 1–5° C./minute to 650–950° C. in an inert atmosphere ($N_2$, Ar or vacuum)
(d) Dwell at desired temperature for 2–8 hours
(e) Cool to room temperature at a rate of 1–5° C./minute
(f) Remove from furnace when temperature of furnace <25° C.
(g) Transfer to bench top. $MoO_2$ is not air sensitive.
(h) Powderize
(i) Optionally, re-pelletize and repeat steps (c) through (h) above Step 2: Production of $LiMoO_2$ using $Li_2CO_3$ + $MoO_2$ produced in Step 1

Reaction assumes C→CO reaction (i.e. >650° C.)

Reaction:

$$0.5\ Li_2CO_3 + 1.0\ MoO_2 + 0.5\ C \rightarrow LiMoO_2 + 0.5\ CO_2 + 0.5\ CO$$

0.5 g-mol $Li_2CO_3$ is equivalent to 36.95 g
1.0 g-mol $MoO_2$ is equivalent to 127.94 g
0.5 g-mol C is equivalent to 6.00 g
An excess of carbon—typically 0–100% mass excess may be used.
Method:
(a) Pre-mix powders in molar proportions as shown
(b) Pelletize powder mixture
(c) Heat pellet at rate of 1–5° C./minute to 650–950° C. in inert atmosphere ($N_2$, Ar or vacuum)
(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above

Example 5

Carbothermal Reduction of $MoO_3$ to $MoO_2$ Followed by Carbothermal Reduction of $MoO_2$ using $Li_2CO_3$ as Lithium Source to Produce $Li_xMoO_2$ Step 1: Production of $MoO_2$ $MoO_2$ is prepared by carbothermal reduction of $MoO_3$ as in Step 1 of Example 4.

Step 2: Production of $Li_xMoO_2$ using $Li_2CO_3$

For example, $Li_{0.74}MoO_2$ and $LiO_{0.85}MoO_2$ were synthesized by this method.

Reaction assumes C→CO reaction (i.e. >650° C.)

Reaction:

$$x/2\ Li_2CO_3 + 1.0\ MoO_2 + x/2\ C \rightarrow Li_xMoO_2 + x/2\ CO_2 + x/2\ CO$$

x/2 g-mol $Li_2CO_3$ is equivalent to (x/2 multiplied by 73.89) g
1.0 g-mol $MoO_2$ is equivalent to 127.94 g
x/2 g-mol C is equivalent to (x/2 multiplied by 12.00) g
An excess of carbon—typically 0–100% mass excess may be used.
Method:
(a) Pre-mix powders in molar proportions as shown
(b) Pelletize powder mixture
(c) Heat pellet at rate of 1–5° C./minute to 650–950° C. in inert atmosphere ($N_2$, Ar or vacuum)
(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above.

Example 6

Direct Carbothermal Reduction of $MoO_3$ using $Li_2CO_3$ as Lithium Source to Produce $Li_4Mo_3O_8$ Reaction assumes C→CO reaction (i.e. >650° C.)

Reaction:

$$2.0\ Li_2CO_3 + 3.0\ MoO_3 + 3.0\ C \rightarrow Li_4Mo_3O_8 + 2.0\ CO_2 + 3.0\ CO$$

2.0 g-mol $Li_2CO_3$ is equivalent to 221.67 g
3.0 g-mol $MoO_3$ is equivalent to 431.82 g
3.0 g-mol C is equivalent to 36.00 g An excess of carbon—typically 0–100% mass excess may be used.

Method:
(a) Pre-mix powders in molar proportions as shown
(b) Pelletize powder mixture
(c) Heat pellet at rate of 1–5° C./minute to 650–950° C. in inert atmosphere ($N_2$, Ar or vacuum)
(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above Example 7

Carbothermal Reduction of $MoO_3$ to $MoO_2$ Followed by Reaction of $MoO_2$ with $Li_2CO_3$ as Lithium Source to Produce $Li_4Mo_3O_8$:

Reaction assumes C→CO reaction (i.e. >650° C.)

Step 1: Production of $MoO_2$

Reaction:
For reaction, see Step 1 of Example 4.

Step 2: Production of $Li_4Mo_3O_8$ using $Li_2CO_3$ and $MoO_2$ from Step 1

Reaction:

$$2.0\ Li_2CO_3 + 3.0\ MoO_2 \rightarrow Li_4Mo_3O_8 + 2.0\ CO_2$$

2.0 g-mol $Li_2CO_3$ is equivalent to 147.78 g
3.0 g-mol $MoO_2$ is equivalent to 383.82 g Method:
(a) Pre-mix powders in molar proportions as shown
(b) Pelletize powder mixture
(c) Heat pellet at rate of 1–5° C./minute to 650–950° C. in inert atmosphere ($N_2$, Ar or vacuum)
(d) Dwell at desired temperature for 2–8 hours
(e) Cool to room temperature at a rate of 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above Example 8

Direct Reduction of $Li_2MoO_4$ using Mo Metal to Produce $LiMoO_2$

Reaction:

$$0.5\ Li_2MoO_4 + 0.5\ Mo \rightarrow LiMoO_2$$

0.5 g-mol $Li_2MoO_4$ is equivalent to 86.91 g
0.5 g-mol Mo is equivalent to 47.97 g
An excess of Mo—typically 0–100% mass excess may be used.

Method:
(a) Pre-mix powders in molar proportions as shown
(b) Pelletize powder mixture
(c) Heat pellet at rate of 1–5° C./minute to 650–950° C. in inert atmosphere ($N_2$, Ar or vacuum)
(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above Example 9

Reduction of $MoO_3$ to $MoO_2$ using Mo Metal Followed by Reduction of $MoO_2$ using Mo Metal and $Li_2CO_3$ as Lithium Source to Produce $Li_xMoO_2$ Step 1: Production of $MoO_2$ Reaction:

$$0.667\ MoO_3 + 0.333\ Mo \rightarrow MoO_2$$

0.667 g mol $MoO_3$ is equivalent to 95.96 g
0.333 g mol Mo metal is equivalent to 31.98 g
An excess of Mo—typically 0–100% mass excess may be used.

Method:
(a) Pre-mix powders in molar proportions as shown
(b) Pelletize powder mixture
(c) Heat the pellet at a rate of 1–5° C./minute to 650–950° C. in an inert atmosphere ($N_2$, Ar or vacuum)
(d) Dwell at desired temperature for 2–8 hours
(e) Cool to room temperature at a rate of 1–5° C./minute
(f) Remove from furnace when temperature of furnace <25° C.
(g) Transfer to bench top. $MoO_2$ is not air sensitive.
(h) Powderize
(i) Optionally, re-pelletize and repeat steps (c) through (h) above Step 2: Production of $Li_xMoO_2$ using $Li_2CO_3$ For example, $Li_{0.74}MoO_2$ and $Li_{0.85}MoO_2$ may be synthesized by this method.

Additional Considerations:

Carbothermally produced $MoO_2$ (Example 4, Step 1) could also be used for Step 2.

Reaction:

$$x/2\ Li_2CO_3 + 0.75\ MoO_2 + 0.25\ Mo \rightarrow Li_xMoO_2 + x/2\ CO_2$$

x/2 g-mol $Li_2CO_3$ is equivalent to (x/2 multiplied by 73.89) g
0.75 g-mol $MoO_2$ is equivalent to 95.96 g
0.25 g-mol Mo metal is equivalent to 23.99 g
An excess of Mo—typically 0–100% mass excess may be used.

Method:
(a) Pre-mix powders in molar proportions as shown
(b) Pelletize powder mixture
(c) Heat pellet at rate of 1–5° C./minute to 650–950° C. in inert atmosphere ($N_2$, Ar or vacuum)
(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above

Example 10

Reduction of $MoO_3$ to $MoO_2$ using Mo Metal Followed by Reaction of $MoO_2$ with $Li_2CO_3$ as Lithium Source to Produce $Li_4Mo_3O_8$ Step 1: Production of $MoO_2$ Reaction:

$$0.667\ MoO_3 + 0.333\ Mo \rightarrow MoO_2$$

0.667 g-mol $MoO_3$ is equivalent to 95.96 g
0.333 g-mol Mo metal is equivalent to 31.98 g
An excess of Mo—typically 0–100% mass excess may be used.
Method:
(a) Pre-mix powders in molar proportions as shown
(b) Pelletize powder mixture
(c) Heat pellet at a rate of 1–5° C./minute to 650–950° C. in an inert atmosphere ($N_2$, Ar or vacuum)
(d) Dwell at desired temperature for 2–8 hours
(e) Cool to room temperature at a rate of 1–5° C./minute
(f) Remove from furnace when temperature of furnace <25° C.
(g) Transfer to bench top. $MoO_2$ is not air sensitive.
(h) Powderize
(i) Optionally, re-pelletize and repeat steps (c) through (h) above Step 2: Production of $Li_4Mo_3O_8$ using $Li_2CO_3$ as lithium source and using $MoO_2$ Produced in Step 1

Carbothermally produced $MoO_2$ (Example 4, Step 1) may also be used for Step 2.
Reaction:

$$2.0\ Li_2CO_3 + 3.0\ MoO_2 \rightarrow Li_4Mo_3O_8 + 2.0\ CO_2$$

2.0 g-mol $Li_2CO_3$ equivalent to 147.78 g
3.0 g-mol $MoO_2$ is equivalent to 383.82 g
Method:
(a) Pre-mix powders in molar proportions as shown
(b) Pelletize powder mixture
(c) Heat the pellet at a rate of 1–5° C./minute to 650–950° C. in an inert atmosphere ($N_2$, Ar or vacuum)
(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above

Example 11

Direct reduction of $Li_2MoO_4$ using Mo Metal to Produce $Li_4Mo_3O_8$

Reaction:

$$2.0\ Li_2MoO_4 + 1.0\ Mo \rightarrow Li_4Mo_3O_8$$

2.0 g-mol $Li_2MoO_4$ is equivalent to 347.64 g
1.0 g-mol Mo is equivalent to 95.94 g
An excess of Mo—typically 0–100% mass excess—may be used.
Method:
(a) Pre-mix powders in molar proportions as shown.
(b) Pelletize the powder mixture.
(c) Heat the pellet at a rate of 1–5° C./minute to 650–950° C. in an inert atmosphere ($N_2$, Ar or vacuum).
(d) Dwell at desired temperature for 2–8 hours.
(e) Cool to room temperature at rate 1–5° C./minute.
(f) Remove from furnace when temperature of furnace <25° C.
(g) Transfer to an inert atmosphere (e.g. Ar glove box). These materials are generally air sensitive.
(h) Powderize.
(i) Optionally, re-pelletize and repeat steps (c) through (h) above.

Experimental—Electrochemical Measurements and Electrode Formulations

Electrochemical cells used for materials evaluation, were constructed in (i) lithium metal anode and (ii) lithium ion configurations. In lithium metal cells the active materials were cycled against a lithium metal counter electrode. In lithium ion configuration the active materials were cycled versus a suitably capacity balanced carbon electrode. In all lithium ion cells the active carbon used was MCMB-2528, which is a mesocarbon microbead (graphitic) material supplied by Alumina Trading, which is the U.S. distributor for the supplier, Osaka Gas Company of Japan.

The lithiated molybdenum oxides were used to formulate the positive electrode. The electrode was fabricated by solvent casting a slurry of the lithiated molybdenum oxides, conductive carbon, binder and solvent. The conductive carbon used was Super P (MMM Carbon). Kynar Flex 2801 was used as the binder and the electronic grade acetone was used as the solvent. The slurry was cast onto glass and a free-standing electrode film was formed as the solvent evaporated. The proportions are as follows on a weight basis: 80% active material; 8% Super P carbon; and 12% Kynar binder.

The MCMB-2528 carbon was used to formulate the negative electrode for the lithium ion test cells. The graphite carbon electrode was fabricated by solvent casting a slurry of MCMB-2528 graphite, conductive carbon, binder and casting solvent. The conductive carbon used was Super P (MMM Carbon). Kynar Flex 2801 was used as the binder and the electronic grade acetone was used as the solvent. The slurry was cast onto glass and a free-standing electrode film was formed as the solvent evaporated. The proportions are as follows on a weight basis: 85% active material; 3% Super P carbon; and 12% Kynar binder.

For all electrochemical cells the liquid electrolyte was ethylene carbonate/dimethyl carbonate, EC/DMC (2:1 by weight) and 1 M $LiPF_6$. This was used in conjunction with a glass fiber filter to form the anode-cathode separator.

Routine electrochemical testing was carried out with a commercial battery cycler utilizing constant current cycling between pre-set voltage limits. High-resolution electrochemical data was collected using the Electrochemical Voltage Spectroscopy (EVS) technique. Such technique is known in the art as described in Synth. Met. D217 (1989); Synth. Met. 32, 43 (1989); J. Power Sources, 52, 185 (1994); and Electrochimica Acta 40, 1603 (1995). Long term cycling of lithium metal cells was undertaken using a commercial Maccor Inc. Battery Cycler.

Experimental: Structural Measurements

A Siemens D500 x-ray diffractometer equipped with Cu $K_\alpha$ radiation ($\lambda$=1.54056 Å) was used for x-ray diffraction (XRD) studies of the as-made materials.

As a guide to the collected data for the $LiMoO_2$ system, we have calculated a XRD powder pattern, refined in the hexagonal system, space group R$\bar{3}$m (see Aleandri and McCarley, Inorg Chem., 27, 1041, 1988) using Cu $K_\alpha$ radiation. Selected peaks of the XRD pattern are given in Table 1.

TABLE 1

Calculated powder pattern (2-Theta between 10–50°) for $LiMoO_2$ with hexagonal cell (R$\bar{3}$m) using Cu K$\alpha$ radiation ($\lambda$ = 1.54056 Å).

| d- spacing, (Å) | hkl | 2-Theta, (°) |
|---|---|---|
| 5.937 | 003 | 16.565 |
| 2.922 | 006 | 33.963 |
| 2.742 | 101 | 36.257 |
| 2.647 | 012 | 37.600 |
| 2.336 | 104 | 42.778 |
| 2.165 | 015 | 46.323 |

Calculated Hexagonal unit cell: R$\bar{3}$m, a = b = 2.8902 Å, c = 15.7976 Å, cell volume = 114.2839 Å$^3$.

Characterization of Active Materials:

FIG. 1 shows the XRD data from the $LiMoO_2$ product made according to Example 1 from $MoO_3/Li_2CO_3$/carbon. 1.388 g of $Li_2CO_3$ (Pacific Lithium Company), 5.400 g of $MoO_3$ (Aldrich Chemical), and 1.013 g of Shawinighan Black Carbon (Chevron) were used. The reaction was carried out for 4 h at 850° C. under an argon atmosphere. The product compound appeared black in color and had good uniformity. The product included carbon that remained unreacted following the carbothermal reaction. The product was placed in an argon-filled glove box immediately following the preparative stage.

The x-ray diffraction pattern contained all the peaks expected for this material as described Table 1. However, other smaller unidentified peaks are also evident, demonstrating that this material has a low level of impurities present. It is likely that some level of partially-reduced Li—Mo—O compounds are also contained in the product.

Figure 2:
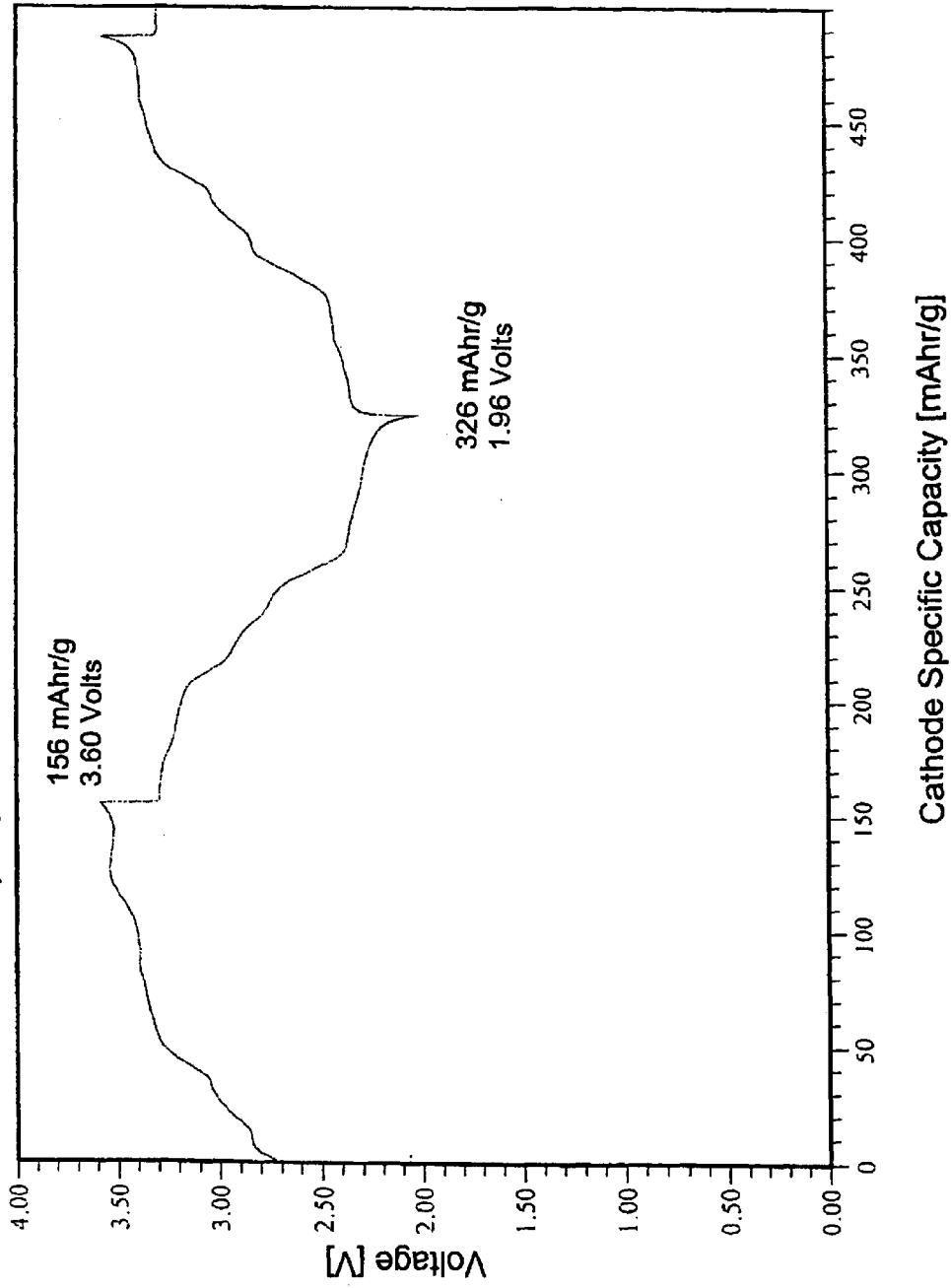
FIG. 2 is current cycling results with $LiMoO_2$ in the positive electrode.

FIG. 2 (Cell#006755) shows the results of the first constant current cycling on the same material using a lithium metal counter electrode at 0.2 mA/cm$^2$ between 2.00 and 3.60 V based upon the 23.2 mg of the $LiMoO_2$ active material in the positive electrode. The testing was carried out at 23° C. The initial measured open circuit voltage (OCV) was approx. 2.70 V vs. Li. Lithium is extracted from the $LiMoO_2$ during charging of the cell. A charge equivalent to a material specific capacity of 156 mAh/g is extracted from the cell. The theoretical specific capacity for $LiMoO_2$ (assuming all the lithium is extracted) is 199 mAh/g. Consequently, the positive electrode active material corresponds to $Li_{1-x}MoO_2$ where x equates to about 0.78, when the active material is charged to about 3.60 V vs. Li. When the cell is discharged to approx. 2.00 V a quantity of lithium is re-inserted into the $Li_{1-x}MoO_2$. The re-insertion process corresponds to approximately 170 mAh/g, indicating that a greater amount of lithium than was extracted may be successfully re-inserted into the material. This demonstrates the excellent reversibility of the $LiMoO2$ material. At 2.00 V the positive active material corresponds to approximately $Li_{1.07}MoO_2$. The generally symmetric nature of the charge-discharge curves further indicates the good reversibility of the system.

Next, $LiMoO_2$ was made using LiOH as a lithium source according to Example 2. 1.678 g of $LiOH.H_2O$(Aldrich Chemical), 5.758 g of $MoO_3$ (Aldrich Chemical), and 1.440 g of Shawinighan Black Carbon (Chevron) were used. The reaction was carried out for 8 h at 850° C. under an argon atmosphere. The product compound appeared black in color and had excellent uniformity. The product included carbon that remained after the carbothermal reaction. The product was placed in an argon-filled glove box immediately following the preparative stage.

Figure 3:
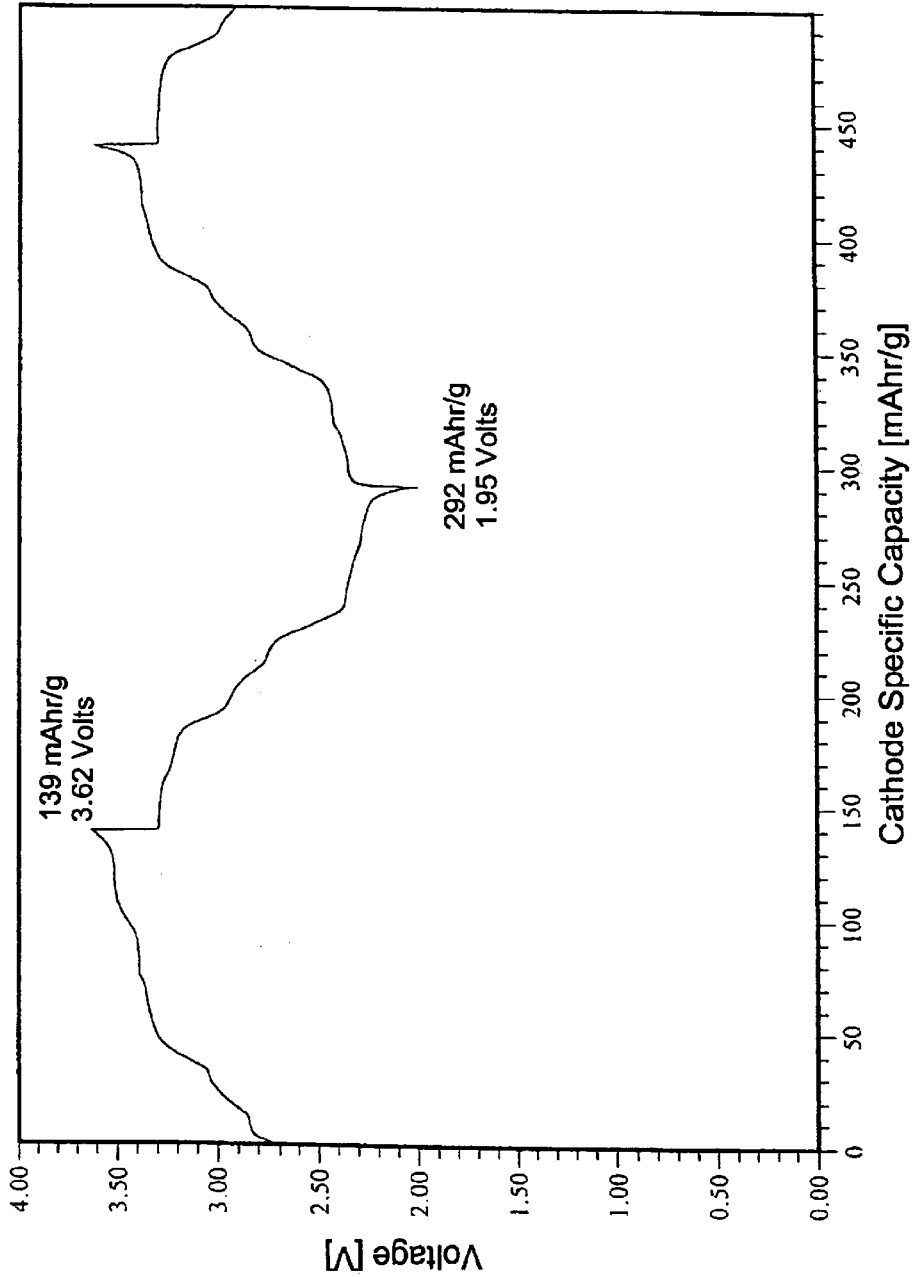
FIG. 3 is current cycling data of $LiMoO_2$ made from $MoO_3$/LiOHH$_2$O/carbon.

FIG. 3 (Cell#006757) shows the results of the first constant current cycling of the Example 2 material using a lithium metal counter electrode at 0.2 mA/cm$^2$ between 2.00 and 3.60 V based upon the 20.5 mg of the $LiMoO_2$ active material in the positive electrode. The testing was carried out at 23° C. The initial measured open circuit voltage (OCV) was approx. 2.70 V vs. Li. Lithium is extracted from the $LiMoO_2$ during charging of the cell. A charge equivalent to a material specific capacity of 139 mAh/g is extracted from the cell. The theoretical specific capacity for $LiMoO_2$ (assuming all the lithium is extracted) is 199 mAh/g. Consequently, the positive electrode active material corresponds to $Li_{1-x}MoO_2$ where x equates to about 0.70, when the active material is charged to about 3.60 V vs. Li. When the cell is discharged to approx. 2.00 V a quantity of lithium is re-inserted into the $Li_{1-x}MoO_2$. The re-insertion process corresponds to approximately 153 mAh/g, indicating that a greater amount of lithium than was extracted may be successfully re-inserted into the material. This demonstrates the excellent reversibility of the $LiMoO_2$ material. At 2.00 V the positive active material corresponds to approx. $Li_{1.07}MoO_2$. The generally symmetrical nature of the charge-discharge curves further indicates the good reversibility of the system.

A material having empirical formula $Li_{0.74}MoO_2$ was made according to Example 3. 0.270 g of $Li_2CO_3$ (Pacific Lithium Company), 1.440 g of $MoO_3$ (Aldrich Chemical), and 0.170 g of Shawinighan Black Carbon (Chevron) were used. The reaction was carried out for 600° C. for 1 h followed by 6 h at 850° C., both under an argon atmosphere. The product compound appeared black in color and had good uniformity. The product included carbon that remained after the carbothermal reaction. The product was placed in an argon-filled glove box immediately following the preparative stage.

Figure 4:
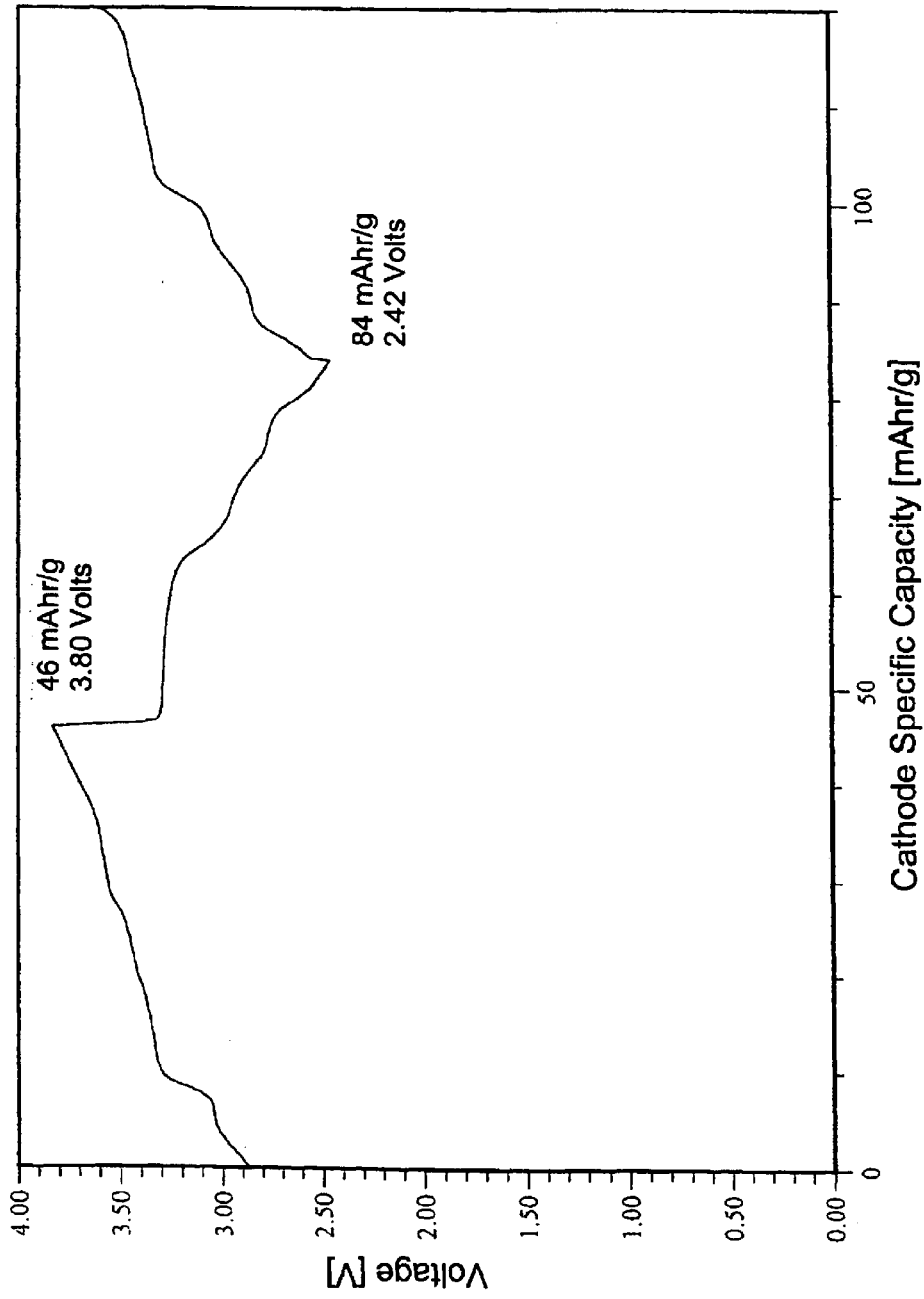
FIG. 4 is current cycling data of $Li_{0.74}MoO_2$ material.

FIG. 4 (Cell#004106) shows the results of the first constant current cycling of the Example 3 material using a lithium metal counter electrode at 0.2 mA/cm between 2.40 and 3.80 V based upon the 17.3 mg of the $Li_{0.74}MoO_2$ active material in the positive electrode. The testing was carried out at 23° C. The initial measured open circuit voltage (OCV) was approx. 2.85 V vs. Li. Lithium is extracted from the $Li_{0.74}MoO_2$ during charging of the cell. A charge equivalent to a material specific capacity of 46 mAh/g is extracted from the cell. The theoretical specific capacity for $Li_{0.74}MoO_2$ (assuming all the lithium is extracted) is 149 mAh/g. Consequently, the positive electrode active material corresponds to $Li_{0.74-x}MoO_2$ where x equates to about 0.23 (i.e. to produce $Li_{0.51}MoO_2$), when the active material is charged to about 3.80 V vs. Li. When the cell is discharged to approx. 2.40 V a quantity of lithium is re-inserted into the $Li_{0.51}MoO_2$. The re-insertion process corresponds to approximately 38 mAh/g. This demonstrates the reversibility of the $Li_{0.74}MoO_2$ material. At 2.40 V the positive active material corresponds to approx. $Li_{0.70}MoO_2$. The generally symmetrical nature of the charge-discharge curves indicates the good reversibility of the system.

Example 4 to produce $LiMoO_2$ is carried out in two steps. The first step is a carbothermal reduction of $MoO_3$ to produce $MoO_2$, while step 2 involves carbothermal reduction and lithium incorporation to produce the $LiMoO_2$ product.

In Step 1, 21.585 g of $MoO_3$ (Aldrich Chemical) and 2.250 g of Shawinighan Black Carbon (Chevron) were used. This amount of carbon equates to a 25% weight excess over the amount calculated from a carbothermal reduction based solely on the C→CO reaction. The reaction was carried out for 4 h at 850° C. under an argon atmosphere. The product compound appeared dark brown in color and had good uniformity. The product included carbon that remained after the carbothermal reaction. The product was stored in laboratory ambient conditions following the preparative stage.

Figure 5:
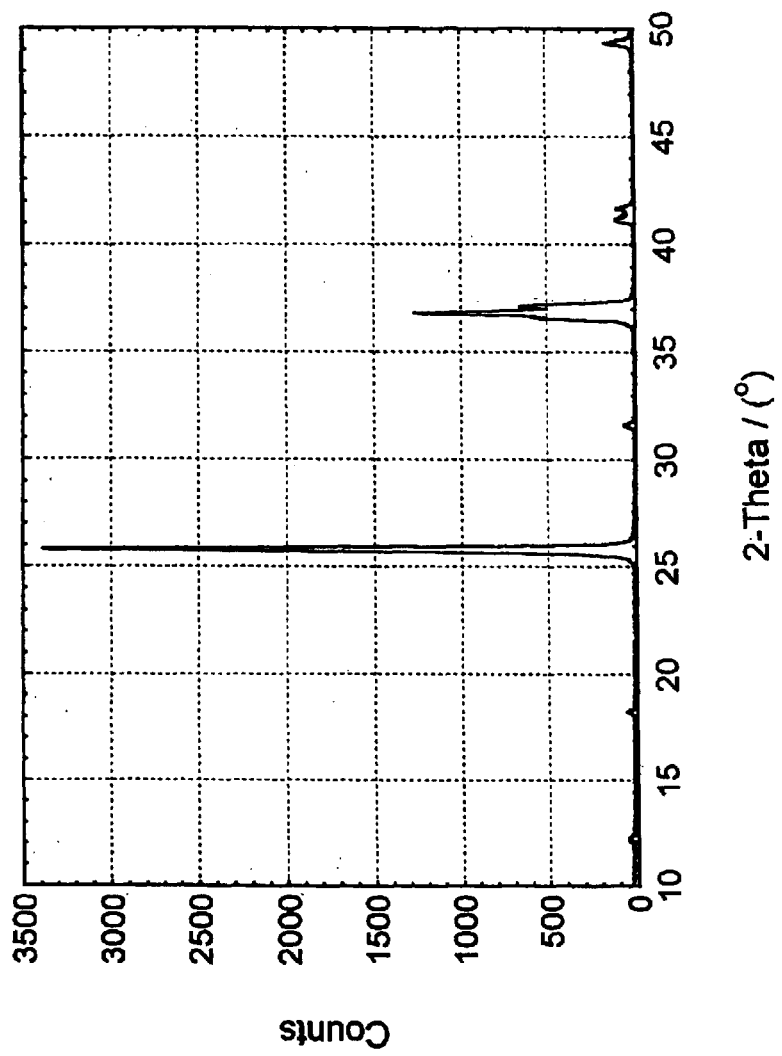
FIG. 5 depicts x-ray diffraction data of $MoO_2$ prepared by carbothermal reduction with 25% excess carbon.
Figure 6:
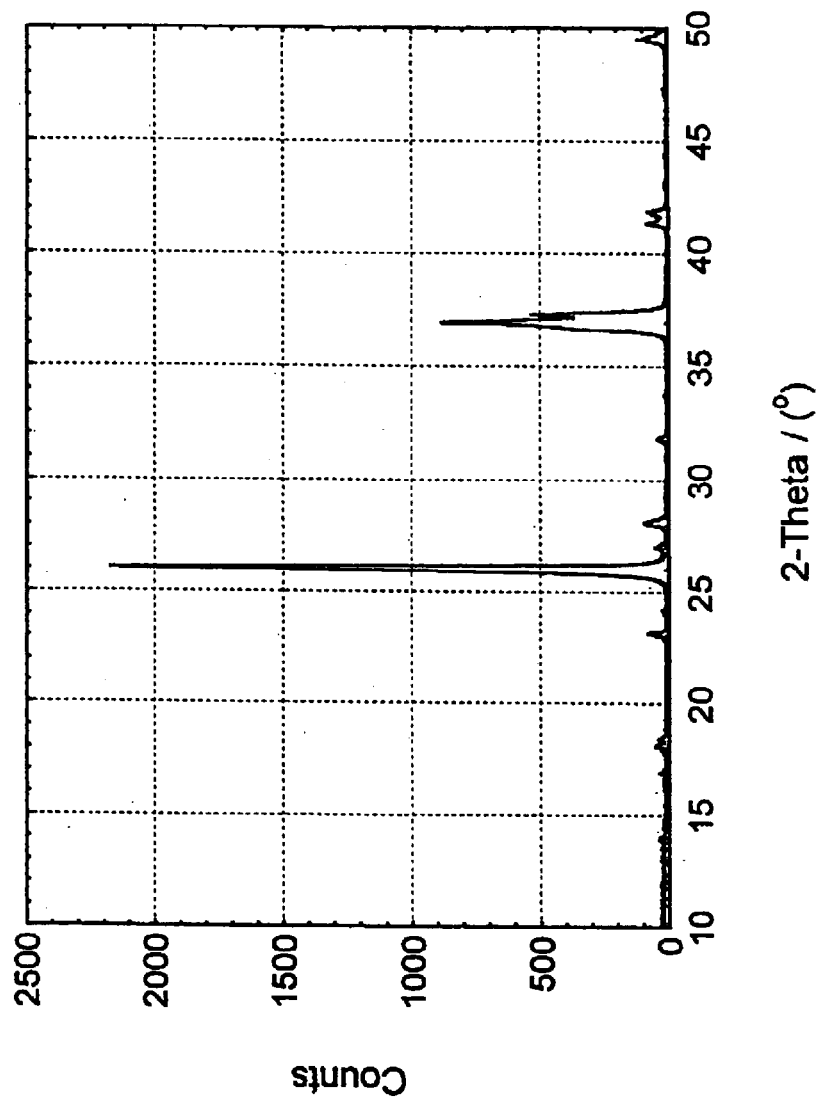
FIG. 6 is x-ray diffraction data of commercial $MoO_2$.

FIG. 5 shows the XRD data from the $MoO_2$ product prepared in Example 4, Step 1 $MoO_3$ and 25% excess carbon. Compare the x-ray diffraction pattern with that recorded from a commercial $MoO_2$ sample available from Alfa-Aesar, shown in FIG. 6. Clearly, all the peaks expected for this material are present in FIG. 5. The XRD data in FIG. 5 are consistent with a single phase, high purity product, with no peaks due to the presence of unreacted precursor.

Figure 7:
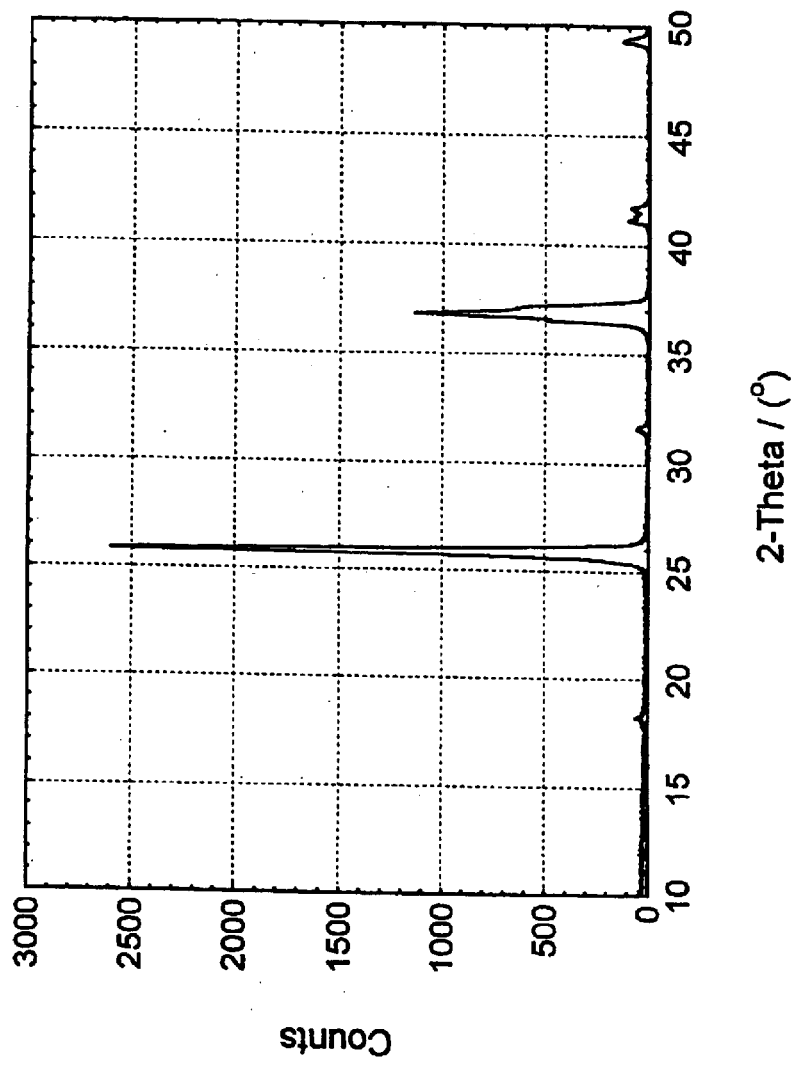
FIG. 7 is x-ray diffraction data of $MoO_2$ prepared by carbothermal reduction with 25% excess carbon.
Figure 8:
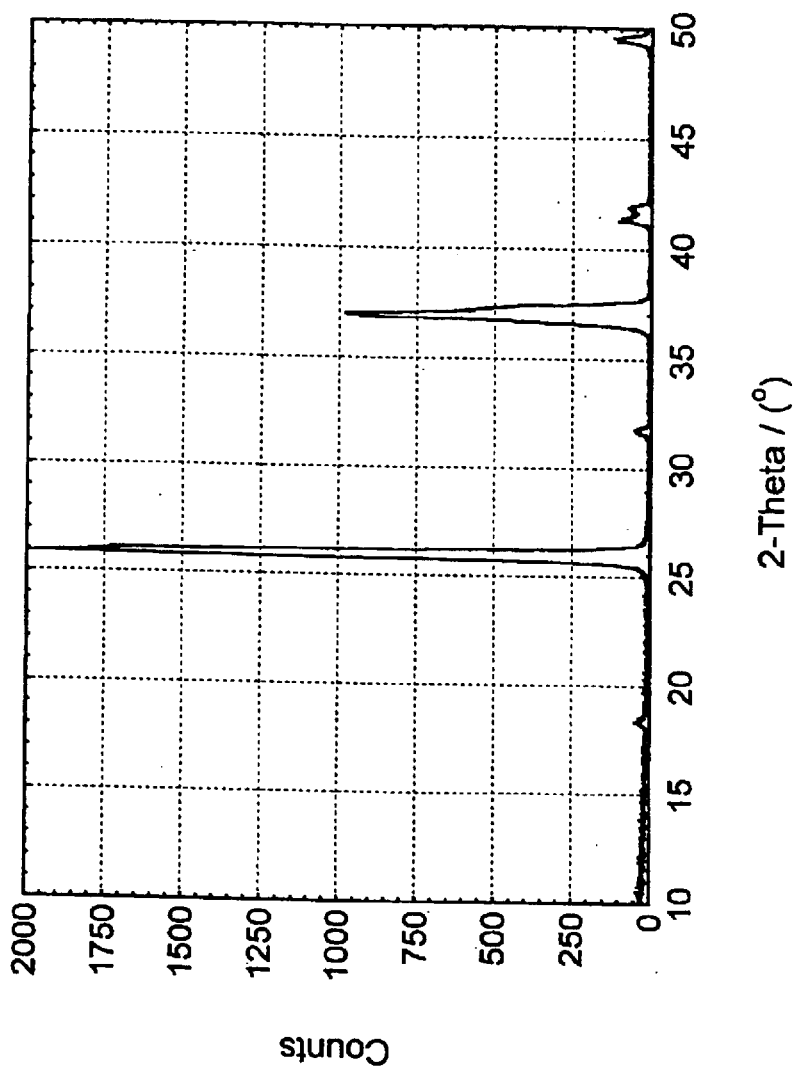
FIG. 8 is x-ray diffraction data $MoO_2$ prepared by carbothermal reduction with 50% excess carbon.
Figure 9:
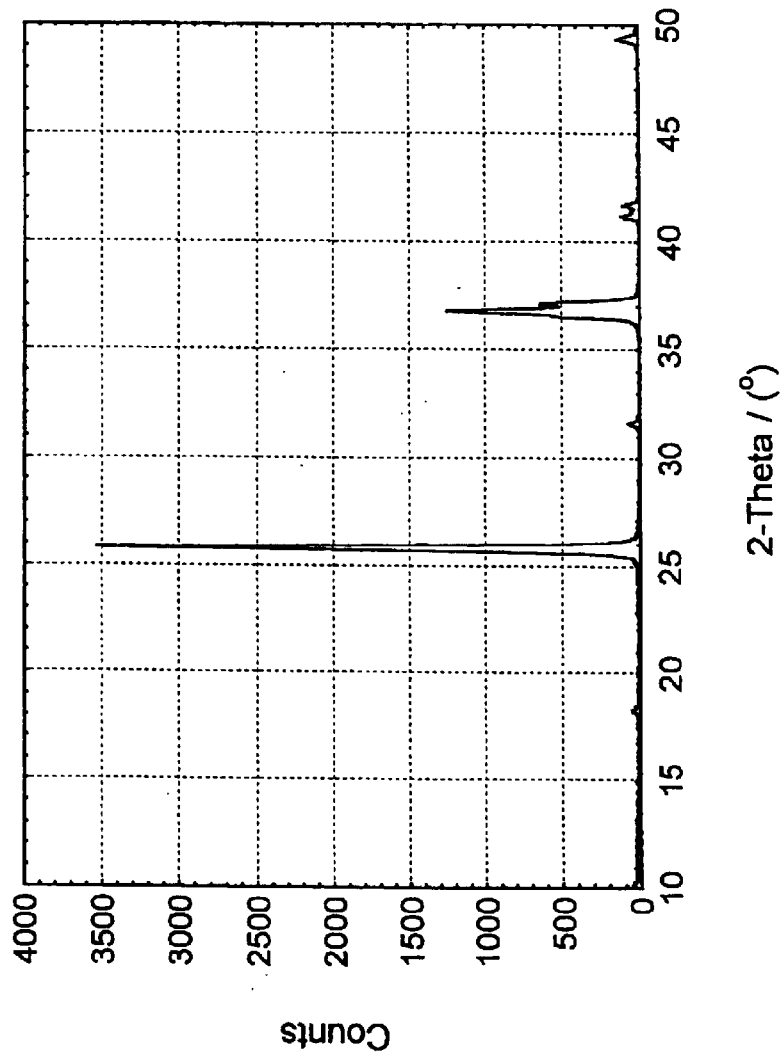
FIG. 9 is x-ray diffraction data $MoO_2$ prepared by carbothermal reduction with 100% excess carbon.

A second set of experiments was undertaken to look at the effect of carbon amount on the quality of the $MoO_2$. FIGS. 7, 8 and 9 show, respectively, the x-ray patterns collected for $MoO_2$ samples produced from the reaction between $MoO_3$ and carbon, where the amount of carbon is 25%, 50% and 100% over the amount required for a carbothermal reduction based on the C→CO reaction. The quality of the $MoO_2$ is high in all cases. All the data are consistent with single phase, high purity $MoO_2$, with no peaks due to the presence of unreacted precursor.

In Step 2 of Example 4, 0.560 g of $Li_2CO_3$ (Pacific Lithium Company), 1.920 g of $MoO_2$ (#2S2433A1), and 0.030 g of Shawinighan Black Carbon (Chevron) were used. The amount of carbon amounts to an approximate 25% weight excess over that calculated for a solely C→CO reaction. The reaction was carried out for 4 h at 850° C. under an argon atmosphere. The product compound appeared black in color and had good uniformity. The product included carbon that remained after the carbothermal reaction. The product was placed in an argon-filled glove box immediately following the preparative stage.

Figure 10:
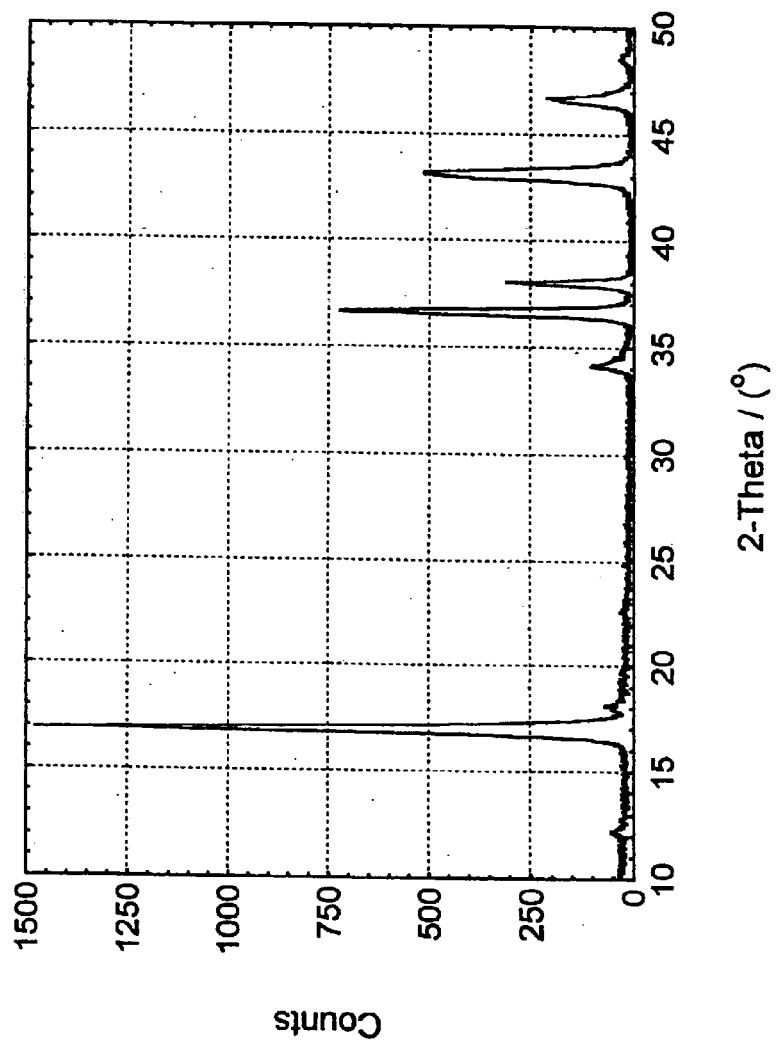
FIG. 10 is x-ray diffraction data from $LiMoO_2$ made from $MoO_2/Li_2CO_3/carbon$ (25% excess).

FIG. 10 shows the x-ray data from the $LiMoO_2$ from product made at 850° C. for 4 hours from $MoO_2/Li_2CO_3$/carbon (25% excess) in Example 4. The x-ray diffraction pattern contained all the peaks expected for this material as described in Table 1. The x-ray data in FIG. 10 are consistent with a single phase, high purity product, with no peaks due to the presence of unreacted precursors.

To investigate the effect of the amount of carbon in the reaction a separate experiment was carried out—using the same precursor $MoO_2$ (i.e. made in Step 1 of Example 4)—only this time using a 100% weight excess of carbon. 0.560 g of $Li_2CO_3$ (Pacific Lithium Company), 1.920 g of $MoO_2$, and 0.120 g of Shawinighan Black Carbon (Chevron) were used. The amount of carbon amounts to an approximate 100% weight excess over that calculated for a solely C→CO reaction. The reaction was carried out for 4 h at 850° C. under an argon atmosphere. The product compound appeared black in color and had good uniformity. The product included carbon that remained after the carbothermal reaction. The product was placed in an argon-filled glove box immediately following the preparative stage.

Figure 11:
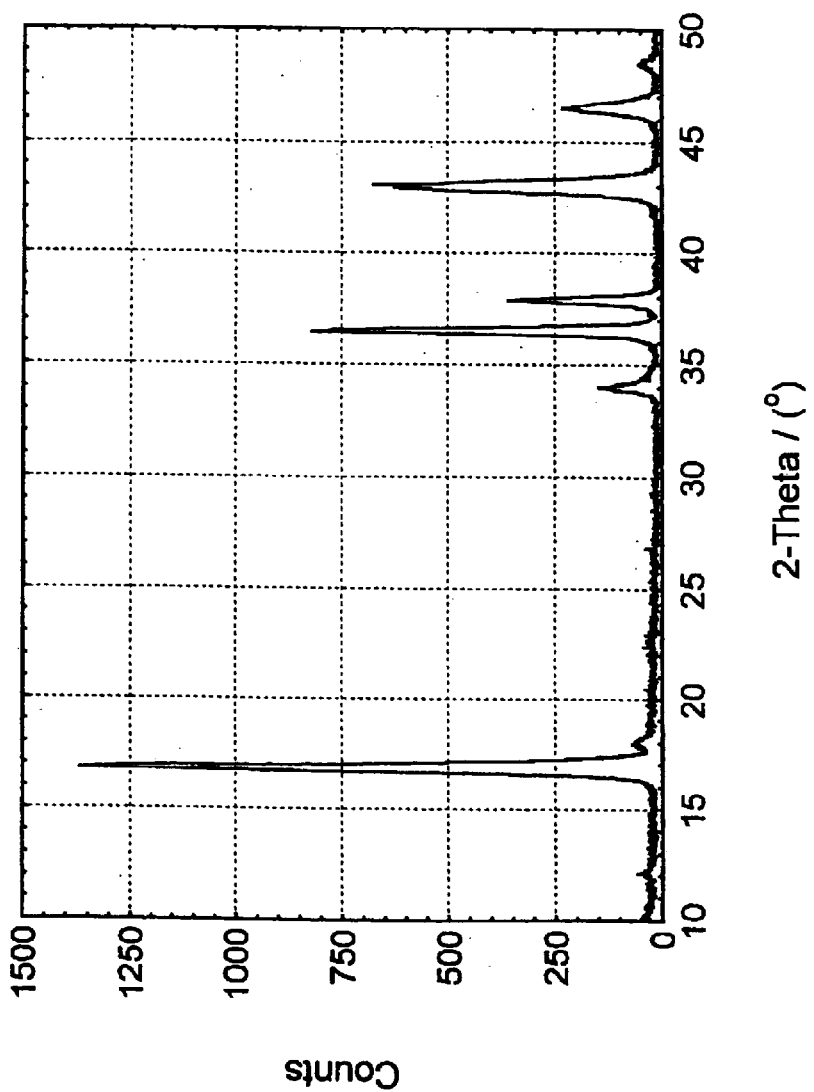
FIG. 11 is x-ray diffraction data from $LiMoO_2$ made from $MoO_2/Li_2CO_3/carbon$ (100% excess).

FIG. 11 shows the x-ray data from the $LiMoO_2$ product made at 850° C. for 4 hours from $MoO_2/Li_2CO_3$/carbon (100% excess). The x-ray diffraction pattern contained all the peaks expected for this material as described in Table 1 and is comparable to that shown in FIG. 10, the 25% excess carbon iteration. The x-ray data in FIG. 11 are consistent with a single phase, high purity product, with no peaks due to the presence of unreacted precursors.

Figure 12:
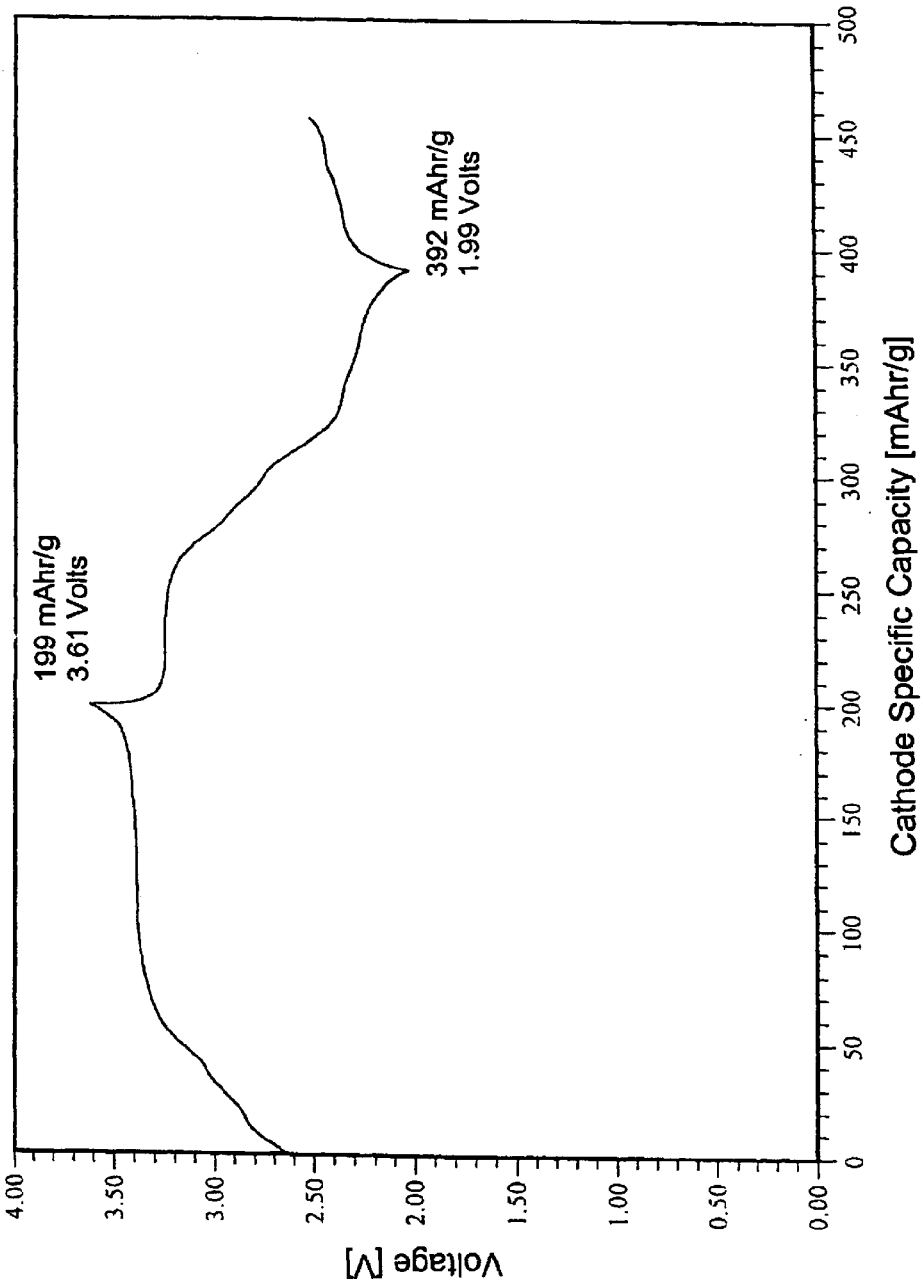
FIG. 12 is current cycling data from $LiMoO_2$ made from $MoO_2/Li_2CO_3/carbon$ (25% excess).

FIG. 12 (Cell#008217) shows the results of the first constant current cycling using a lithium metal counter electrode at 0.2 $mA/cm^2$ between 2.00 and 3.60 V based upon the 21.0 mg of the $LiMoO_2$ (made by Example 4 with 25% excess carbon in Step 2) active material in the positive electrode. The testing was carried out at 23° C. The initial measured open circuit voltage (OCV) was approx. 2.65 V vs. Li. Lithium is extracted from the $LiMoO_2$ during charging of the cell. A charge equivalent to a material specific capacity of 199 mAh/g is extracted from the cell. The theoretical specific capacity for $LiMoO_2$ (assuming all the lithium is extracted) is 199 mAh/g. Essentially all the available lithium is successfully extracted from the structure. Consequently, the positive electrode active material after charging corresponds to $Li_{1-x}MoO_2$ where x equates to about 1.00, when the active material is charged to about 3.60 V vs. Li, indicating all the lithium has been removed from the compound. When the cell is discharged to approx. 2.00 V a quantity of lithium is re-inserted into the $Li_{1-x}MoO_2$. The re-insertion process corresponds to approximately 193 mAh/g, indicating essentially all the lithium extracted during the charge process, could be re-inserted into the $LiMoO_2$ structure. This demonstrates the good reversibility of the $LiMoO_2$ material. At 2.00 V the positive active material corresponds to approx. $Li_{0.97}MoO_2$. The generally symmetrical nature of the charge-discharge curves further indicates the good reversibility of the system.

Figure 13:
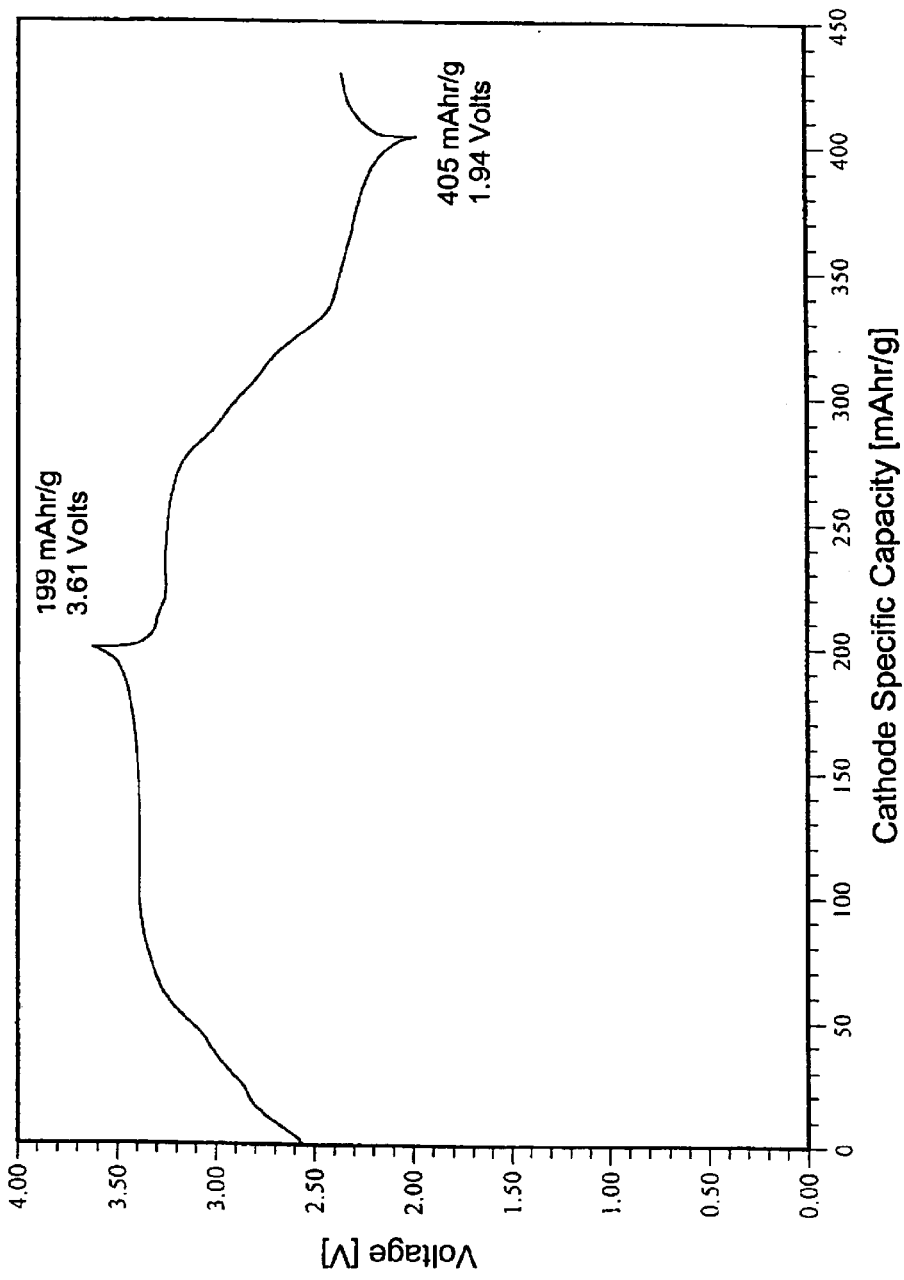
FIG. 13 is current cycling data of $LiMoO_2$ made from $MoO_2/Li_2CO_3/carbon$ (100% excess).

FIG. 13 (Cell#008210) shows the results of the first constant current cycling using a lithium metal counter electrode at 0.2 $mA/cm^2$ between 2.00 and 3.60 V based upon the 20.9 mg of the $LiMoO_2$ (made by Example 4 with 100% excess carbon in Step 2) active material in the positive electrode. The testing was carried out at 23° C. The initial measured open circuit voltage (OCV) was approx. 2.58 V vs. Li. Lithium is extracted from the $LiMoO_2$ during charging of the cell. A charge equivalent to a material specific capacity of 199 mAh/g is extracted from the cell. The theoretical specific capacity for $LiMoO_2$ (assuming all the lithium is extracted) is 199 mAh/g. Again, essentially all the available lithium is successfully extracted from the structure. Consequently, the positive electrode active material corresponds to $Li_{1-x}MoO_2$ where x equates to about 1.00, when the active material is charged to about 3.60 V vs. Li, indicating all the lithium has been removed from the compound. When the cell is discharged to approx. 2.00 V a quantity of lithium is re-inserted into the $Li_{1-x}MoO_2$. The re-insertion process corresponds to approximately 206 mAh/g, indicating that a greater amount of lithium than was extracted may be successfully re-inserted into the material.

Essentially all the lithium extracted during the charge process could be re-inserted into the $LiMoO_2$ structure. This demonstrates the outstanding reversibility of the $LiMoO_2$ material. At 2.00 V the positive active material corresponds to approximately $Li_{1.04}MoO_2$. The generally symmetrical nature of the charge-discharge curves further indicates the good reversibility of the system.

Figure 14:
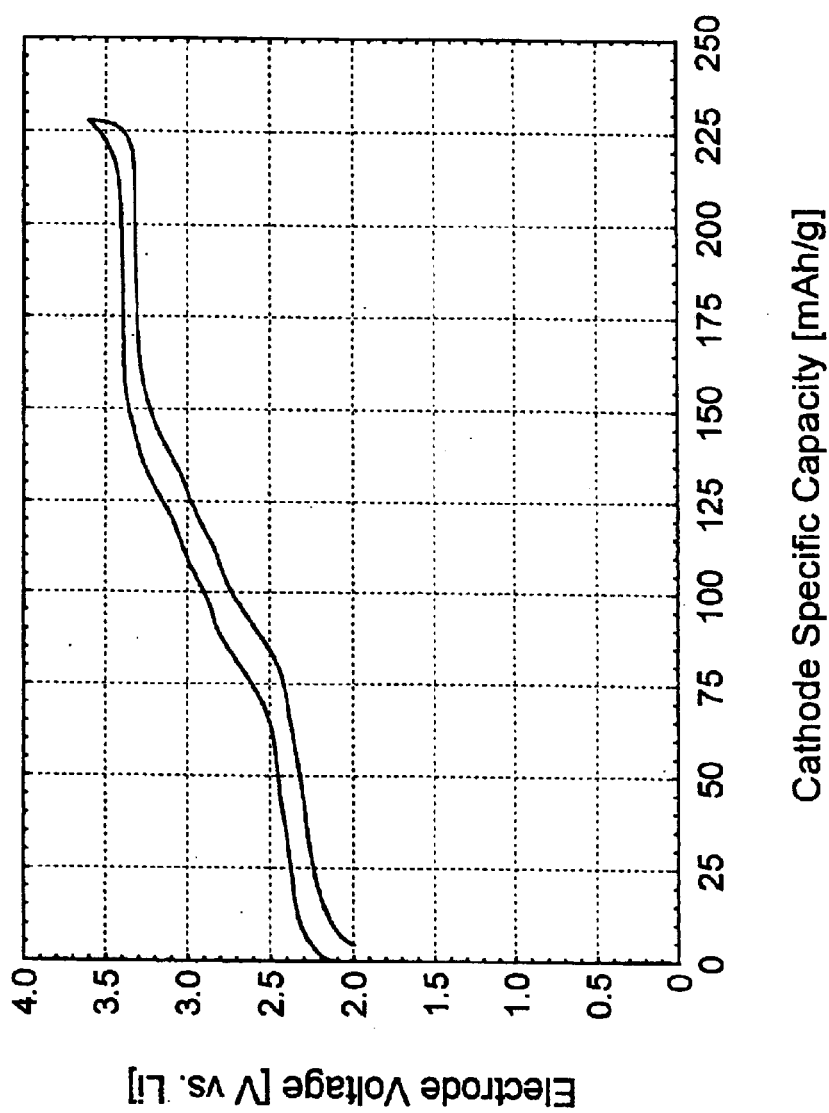
FIG. 14 is electrochemical voltage spectroscopy of $LiMoO_2$ made with 100% excess carbon.
Figure 15:
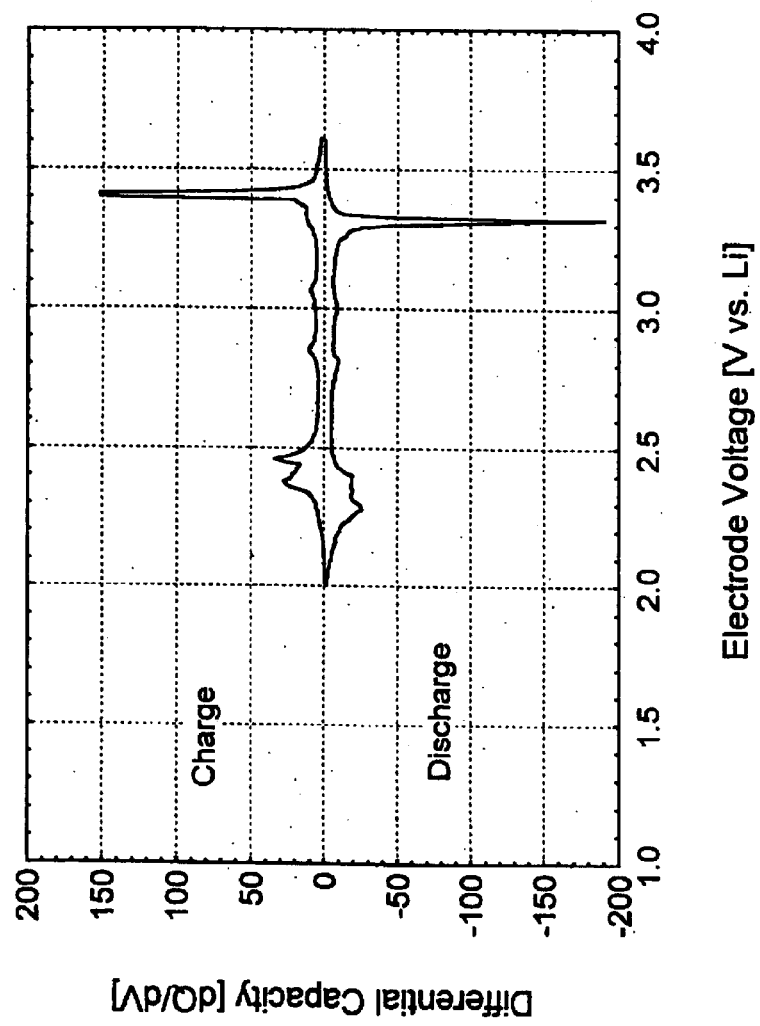
FIG. 15 is differential capacity data for $LiMoO_2$ made with 100% excess carbon.

The $LiMoO_2$ material prepared in Example 4 with 100% excess carbon was subjected to further, high-resolution electrochemical testing using the Electrochemical Voltage Spectroscopy (EVS) technique. FIG. 14 shows results of this test using the method between pre-set voltage limits of 2.00 and 3.60 V. The weight of active positive material was 20.9 mg and the testing was carried out at 23° C. FIG. 14 demonstrates the excellent performance for the active material—a reversible specific capacity of approximately 225 mAh/g between the pre-set voltage limits as well as the good reversibility. The capacity corresponding to the lithium extraction process is essentially the same as the capacity corresponding to the subsequent lithium insertion process. Thus, there is essentially no capacity loss. FIG. 15, the differential capacity data of the same material, indicates excellent reversibility. The symmetrical nature of the peaks indicates good electrochemical reversibility; there are small peak separations (charge/discharge) and good correspondence between peaks above and below the zero axis. There are essentially no peaks that can be related to irreversible reactions, since all the peaks above the axis (cell charge) have corresponding peaks below the axis (cell discharge). This demonstrates that the preparative procedure used to make this material produces a high quality electrode material.

The $MoO_2$ made during the first step of Example 5 is produced under identical conditions to that described for the $MoO_2$ in Example 4, Step 1, above.

In Step 2 of Example 5, $Li0.85MoO_2$ was produced. 0.940 g of $Li_2CO_3$ (Pacific Lithium Company), 3.840 g of $MoO_2$ (#2S2473A1), and 0.154 g of Shawinighan Black Carbon (Chevron) were used. The amount of carbon amounts to an approximate 100% weight excess over that calculated for a solely C→CO reaction. The reaction was carried out for 4 h at 850° C. under an argon atmosphere. The product compound appeared black in color and had good uniformity. The product included carbon that remained after the carbothermal reaction. The product was placed in an argon-filled glove box immediately following the preparative stage.

Figure 16:
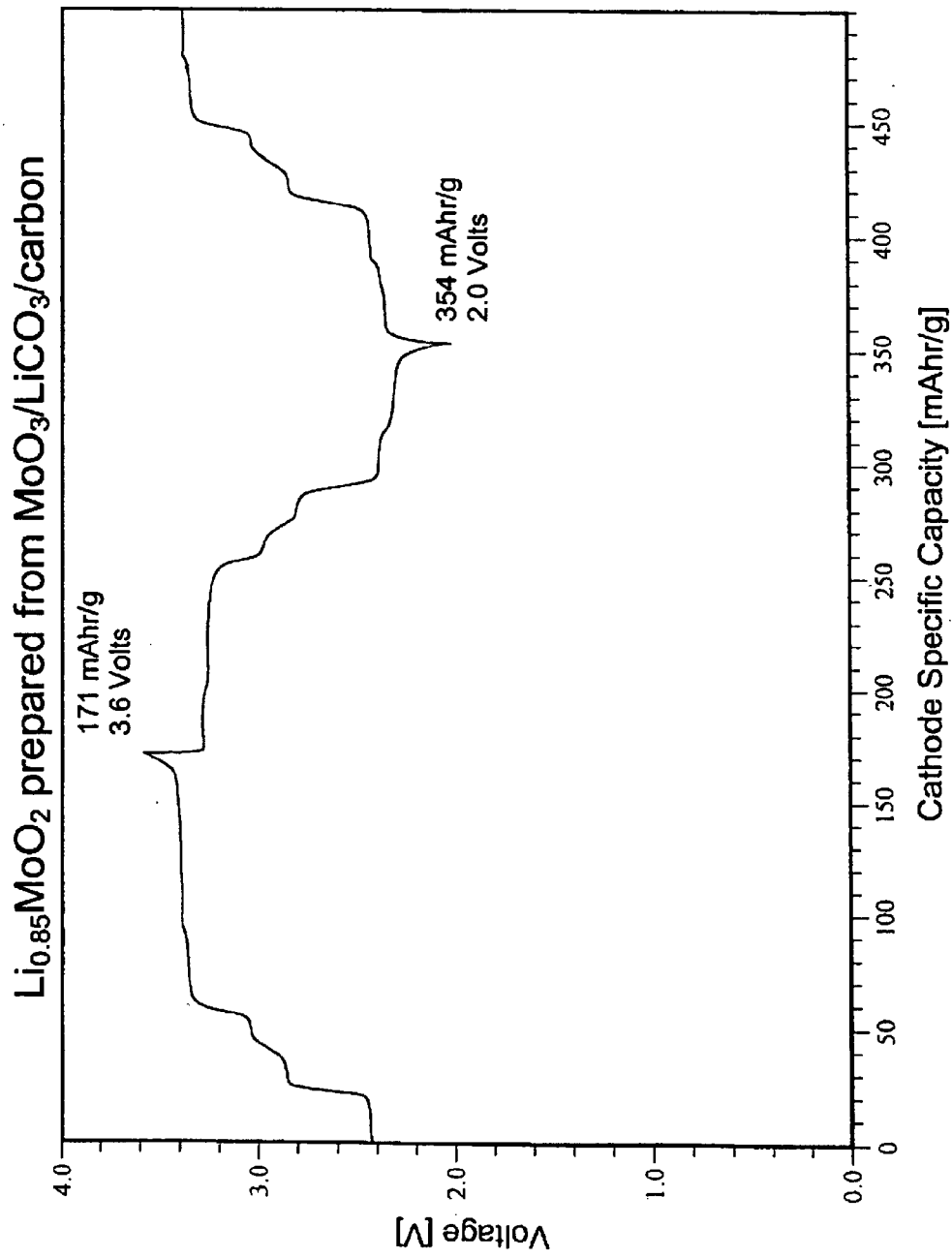
FIG. 16 is current cycling data of $Li_{0.85}MoO_2$.

FIG. 16 (Cell#009020) shows the results of the first constant current cycling using a lithium metal counter electrode at 0.2 mA/cm² between 2.00 and 3.60 V based upon 26.2 mg of the $Li_{0.85}MoO_2$ active material made in Step 2 of Example 5 in the positive electrode. The testing was carried out at 23° C. The initial measured open circuit voltage (OCV) was approx. 2.42 V vs. Li. Lithium is extracted from the $Li_{0.85}MoO_2$ during charging of the cell. A charge equivalent to a material specific capacity of 171 mAh/g is extracted from the cell. The theoretical specific capacity for $Li_{0.85}MoO_2$ (assuming all the lithium is extracted) is 170 mAh/g. Essentially all the available lithium is successfully extracted from the structure. Consequently, the positive electrode active material corresponds to $Li_{0.85-x}MoO_2$ where x equates to about 0.85 (i.e. to produce $Li_{0.00}MoO_2$), when the active material is charged to about 3.60 V vs. Li. When the cell is discharged to approx. 2.00 V a quantity of lithium is re-inserted into the $Li_{0.00}MoO_2$. The re-insertion process corresponds to approximately 183 mAh/g indicating that a greater amount of lithium than was extracted may be successfully re-inserted into the material.

This demonstrates the reversibility of the $Li_{0.85}MoO_2$ material. At 2.00 V the positive active material corresponds to approx. $Li_{0.92}MoO_2$. The generally symmetrical nature of the charge-discharge curves indicates the good reversibility of the system. Note from FIG. 16, the distinct voltage plateaux present—clearly indicating the structural changes occurring within the material during the various cell charge—discharge (lithium extraction-insertion) processes. Also note the excellent correspondence of these voltage plateaux from cell charge to cell discharge. These structural changes are reversible.

In a similar manner to the preparation of $Li_{0.85}MoO_2$ we will now show representative data for the $Li_{0.74}MoO_2$ material made by Example 5. The $MoO_2$ made during the first step of Preparative Example 5 is produced under identical conditions to that described for the $MoO_2$ in Preparative Example 4, Step 1, above.

In Step 2 of Example 5, $Li_{0.74}MoO_2$ is produced. 0.810 g of $Li_2CO_3$ (Pacific Lithium Company), 3.840 g of $MoO_2$ (#2S2473A1), and 0.132 g of Shawinighan Black Carbon (Chevron) were used. The amount of carbon amounts to an approximate 100% weight excess over that calculated for a solely C→CO reaction. The reaction was carried out for 4 h at 800° C. under an argon atmosphere. The product compound appeared black in color and had good uniformity. The product included carbon that remained after the carbothermal reaction. The product was placed in an argon-filled glove box immediately following the preparative stage.

Figure 17:
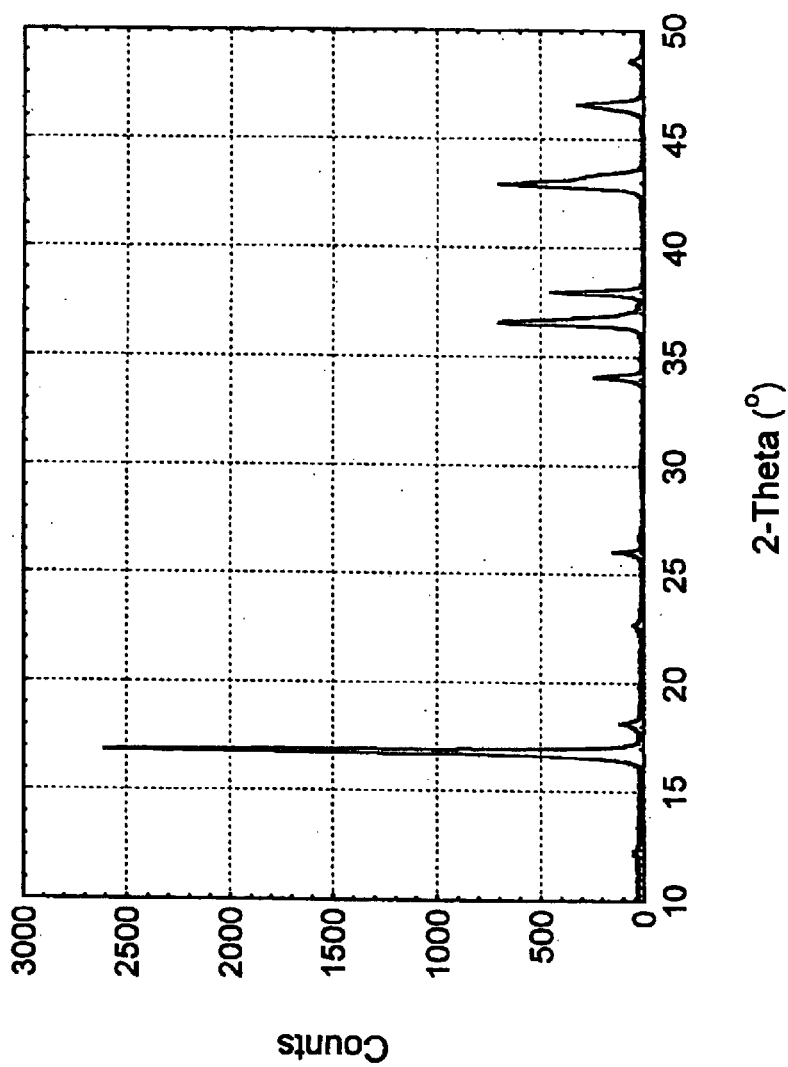
FIG. 17 is x-ray diffraction data of $Li_{0.74}MoO_2$.

FIG. 17 shows the x-ray data from the $Li_{0.74}MoO_2$ product of Example 5 made at 800° C. for 4 hours from $MoO_2/Li_2CO_3$/carbon (100% excess). The x-ray diffraction pattern contains all the expected peaks and is comparable to that shown for high quality $LiMoO_2$ in FIG. 10, the 25% excess carbon iteration. The $Li_{0.74}MoO_2$ material is structurally similar to $LiMoO_2$ and may be alternatively described as $Li_{0.74}V_{0.26}MoO_2$ where V represents a vacant octahedral metal site. The x-ray data in FIG. 17 are consistent with the presence of a single phase, high purity product, with a presence of a small amount of unreacted $MoO_2$.

Figure 18:
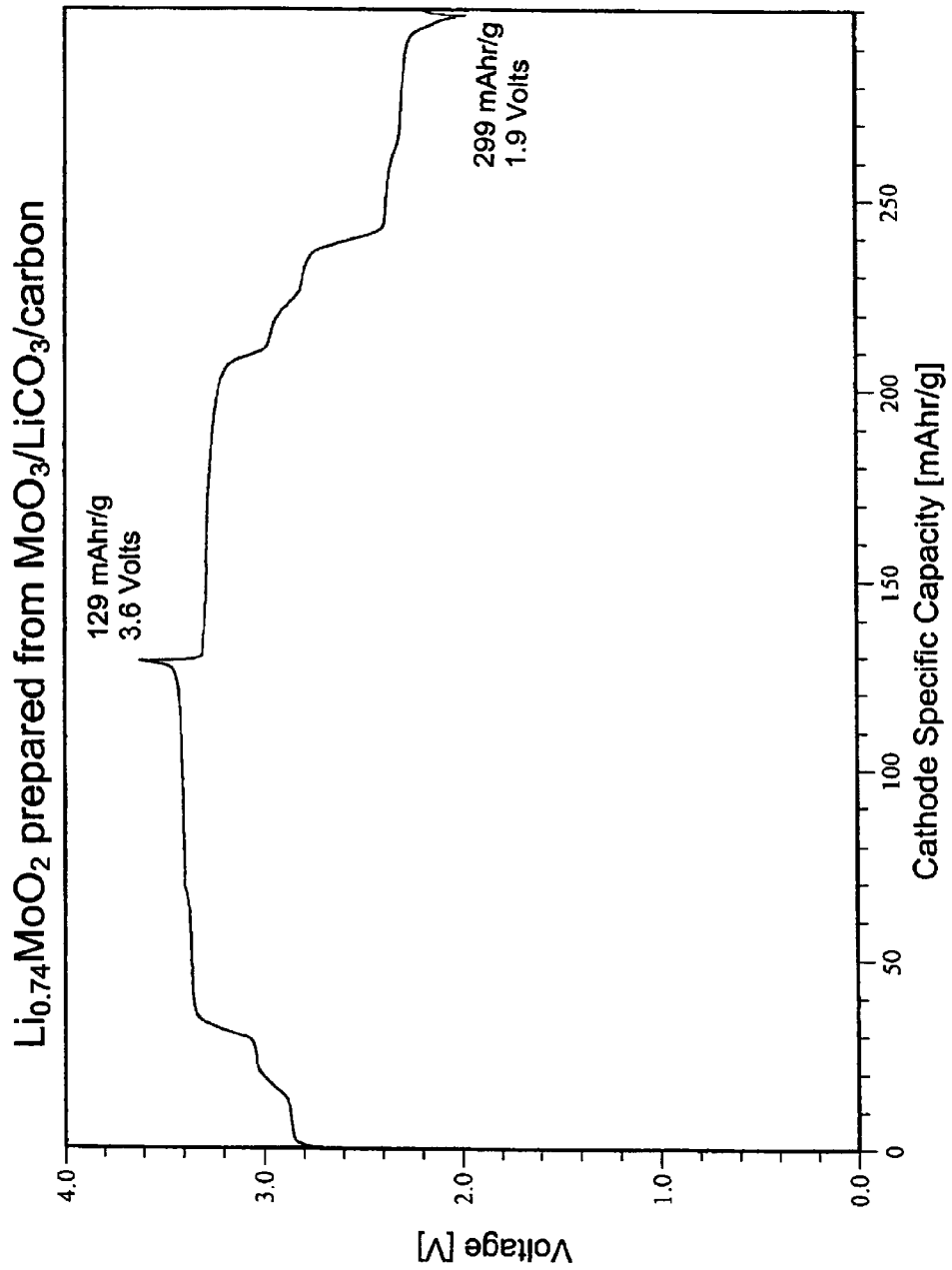
FIG. 18 is current cycling data of $Li_{0.74}MoO_2$.

FIG. 18 (Cell#009027) shows the results of the first constant current cycling using a lithium metal counter electrode at 0.2 mA/cm² between 2.00 and 3.60 V based upon 26.3 mg of the $Li_{0.74}MoO_2$ active material in the positive electrode. The testing was carried out at 23° C. The initial measured open circuit voltage (OCV) was approx. 2.70 V vs. Li. Lithium is extracted from the $Li_{0.74}MoO_2$ during charging of the cell. A charge equivalent to a material specific capacity of 129 mAh/g is extracted from the cell. The theoretical specific capacity for $Li_{0.74}MoO_2$ (assuming all the lithium is extracted) is 149 mAh/g. Consequently, the positive electrode active material corresponds to $Li_{0.74-x}MoO_2$ where x equates to about 0.64 (i.e. to produce $Li_{0.10}MoO_2$), when the active material is charged to about 3.60 V vs. Li. When the cell is discharged to approx. 2.00 V a quantity of lithium is re-inserted into the $Li_{0.10}MoO_2$. The re-insertion process corresponds to approximately 170 mAh/g indicating that a greater amount of lithium than was extracted, may be successfully re-inserted into the material. This demonstrates the reversibility of the $Li_{0.74}MoO_2$ material. At 2.00 V the positive active material corresponds to approximately $Li_{0.94}MoO_2$. The generally symmetrical nature of the charge-discharge curves indicates the good reversibility of the system. Note from FIG. 18, in a similar fashion to that noted for $Li_{0.85}MoO_2$, the distinct voltage plateaux present. This indicates structural changes occurring within the material during the various cell charge—discharge (lithium extraction-insertion) processes. Also note the correspondence of these voltage plateaux from cell charge to cell discharge. The structural changes are reversible.

The $MoO_2$ made during the first step of Preparative Example 7 is produced under identical conditions to that described for the $MoO_2$ in Preparative Example 4, Step 1, above.

In Step 2 of Example 7, $Li_4Mo_3O_8$ is produced by reacting 0.437 g of $Li_2CO_3$ (Pacific Lithium Company) and 1.136 g of $MoO_2$ made in the first step. No additional carbon was added since no reduction of Mo is required to make $Li_4Mo_3O_8$ from $MoO_2$ (both contain Mo in oxidation state +4). This is a lithium incorporation reaction. The reaction was carried out for 4 h at 850° C. under an argon atmosphere. The product compound appeared black in color and had good uniformity. The product was placed in an argon-filled glove box immediately following the preparative stage.

Figure 19:
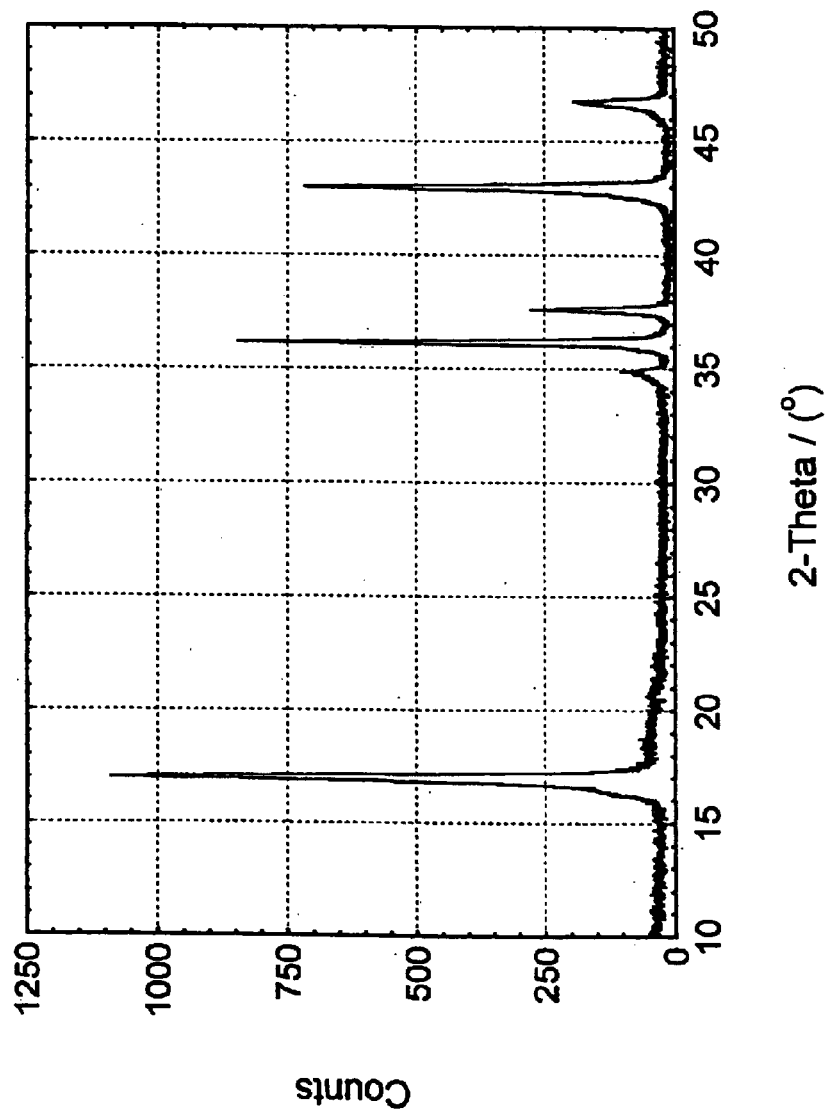
FIG. 19 is x-ray diffraction data of $Li_4Mo_3O_8$.

FIG. 19 shows the x-ray data from the $Li_4Mo_3O_8$ product made at 750° C. for 4 hours from $MoO_2$ and $Li_2CO_3$ in Example 7. The x-ray diffraction pattern for $Li_4Mo_3O_8$ has similar characteristics to that for the structurally similar compound $LiMoO_2$ (they are both layered) as reported by Hibble and Fawcett, Inorg. Chem 34, 500 (1995). In fact, Hibble et al. describe the formula of $Li_4Mo_3O_8$ as better characterized as either $Li[Mo_{3/4}V_{1/4}]O_2$ or $Li_{3/4}V_{1/4}[Mo_{3/4}Li_{1/4}]O_2$, where V is a vacant octahedral metal site, indicating its relationship with $LiMoO_2$ (see Hibble et al. Acta Cryst. B53, 604, 1997)). The x-ray diffraction pattern for the $Li_4Mo_3O_8$ (see FIG. 19) contained all the peaks described in Table 1, and few if any peaks due to the presence of unreacted precursors. It is comparable to that shown in FIG. 15 for high quality $LiMoO_2$. The x-ray data in FIG. 19 are consistent with a single phase, high purity product.

Figure 20:
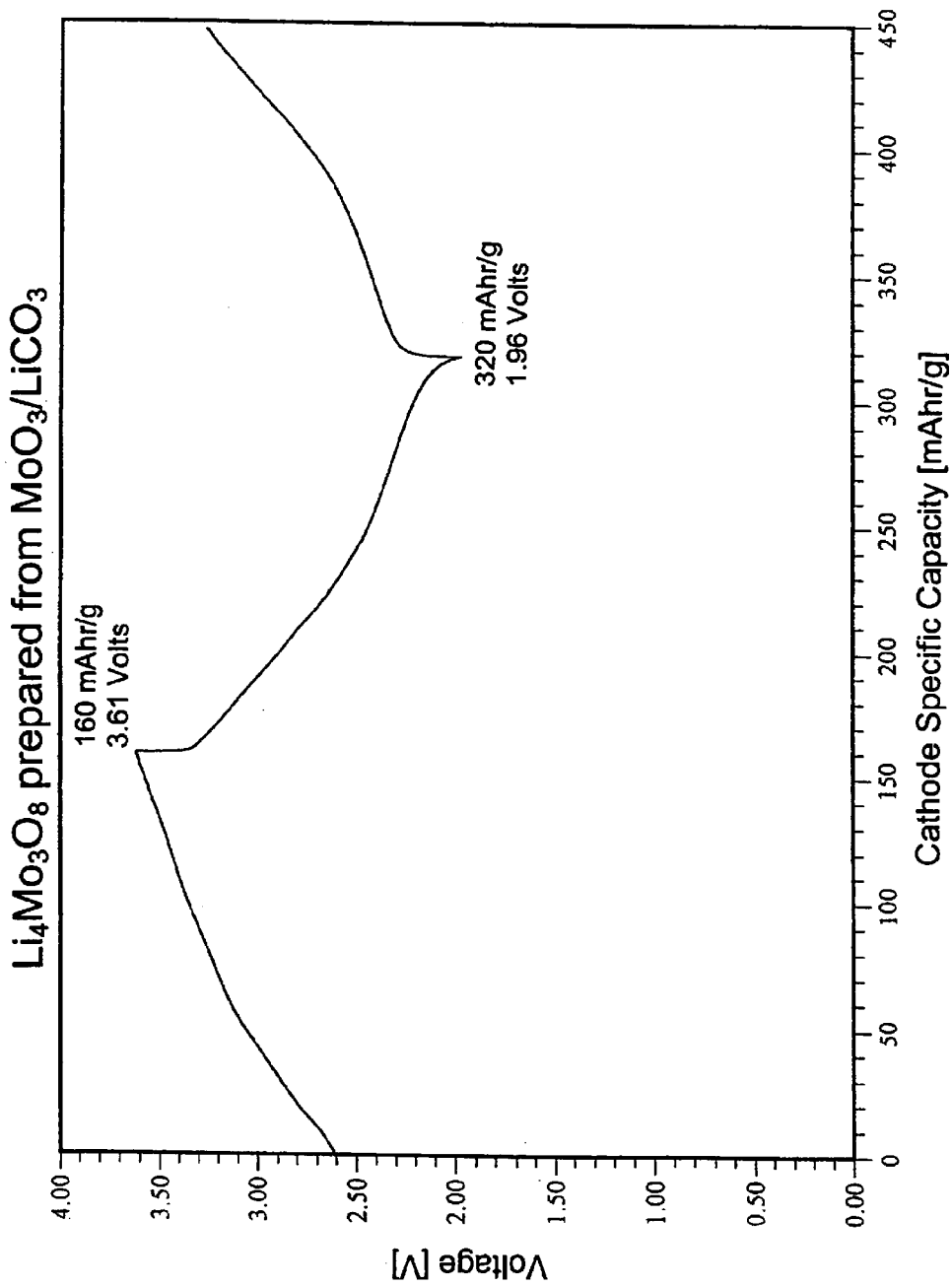
FIG. 20 is current cycling data of $Li_3Mo_4O_8$.

FIG. 20 (Cell#008199) shows the results of the first constant current cycling using a lithium metal counter electrode at 0.2 mA/cm2 between 2.00 and 3.60 V based upon the 21.7 mg of the Li4Mo3O8 active material made in Example 7 in the positive electrode. The testing was carried out at 23° C. The initial measured open circuit voltage (OCV) was approx. 2.62 V vs. Li. Lithium is extracted from the Li4Mo3O8 during charging of the cell. A charge equivalent to a material specific capacity of 160 mAh/g is extracted from the cell. The theoretical specific capacity for Li4Mo3O8 (assuming all the lithium is extracted) is 242 mAh/g. Consequently, the positive electrode active material corresponds to Li4−x Mo3O8 where x equates to about 2.64 (i.e. to produce Li1.36Mo3O8), when the active material is charged to about 3.60 V vs. Li. When the cell is discharged to approx. 2.00 V a quantity of lithium is re-inserted into the Li1.36Mo3O8. The re-insertion process corresponds to approximately 160 mAh/g indicating the reversibility of the Li4Mo3O8 material. At 2.00 V the positive active material corresponds to approximately Li4.00Mo3O8. The generally symmetrical nature of the charge-discharge curves indicates the good reversibility of the system. Note from FIG. 20, the lack of voltage structure in the cell charge discharge behavior. This is different from the voltage response for Li0.74MoO2 and Li0.85MoO2, where distinct voltage plateaus were present. This indicates a lack of structural changes occurring in this material during the lithium extraction-insertion processes.

A $LiMoO_2$ product was made from $Li_2MoO_4$ and Mo metal in Example 8. 3.220 g of $Li_2MoO_4$ (Alfa-Aesar), and 1.780 g of Mo metal (Alfa-Aesar) were used. This corresponds to a stoichiometric mix with no excess of either precursor. The reaction was carried out for 2 h at 950° C. under an argon atmosphere. The product compound appeared black in color and had excellent uniformity. The product was placed in an argon-filled glove box immediately following the preparative stage.

Figure 21:
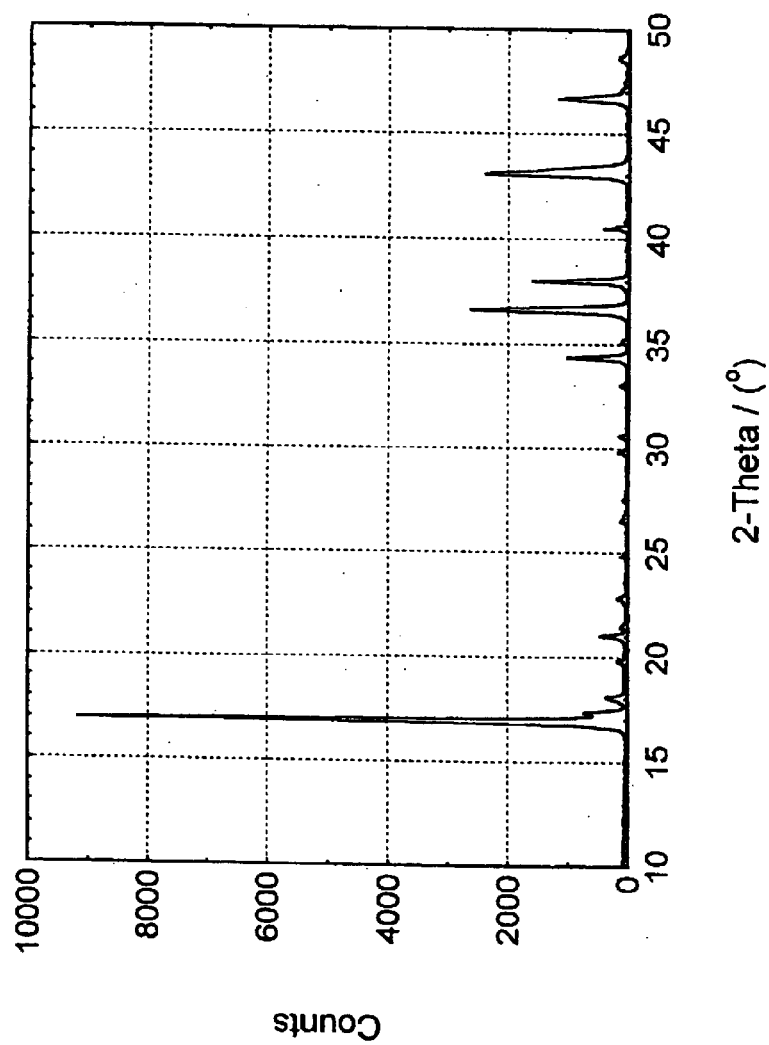
FIG. 21 is x-ray diffraction data of $LiMoO_2$ made from $Li_2MoO_4$ and Mo.

FIG. 21 shows the x-ray diffraction data from the $LiMoO_2$ product made at 950° C. for 2 hours from $Li_2MoO_4$ and Mo metal. The x-ray diffraction pattern contained all the expected peaks for this material as described in Table 1 and is comparable to that shown in FIG. 15, the 25% excess carbon carbothermal $LiMoO_2$ iteration. The x-ray data in FIG. 21 are consistent with the presence of a single phase, high purity product, together with a small amount of unidentified impurities.

Figure 22:
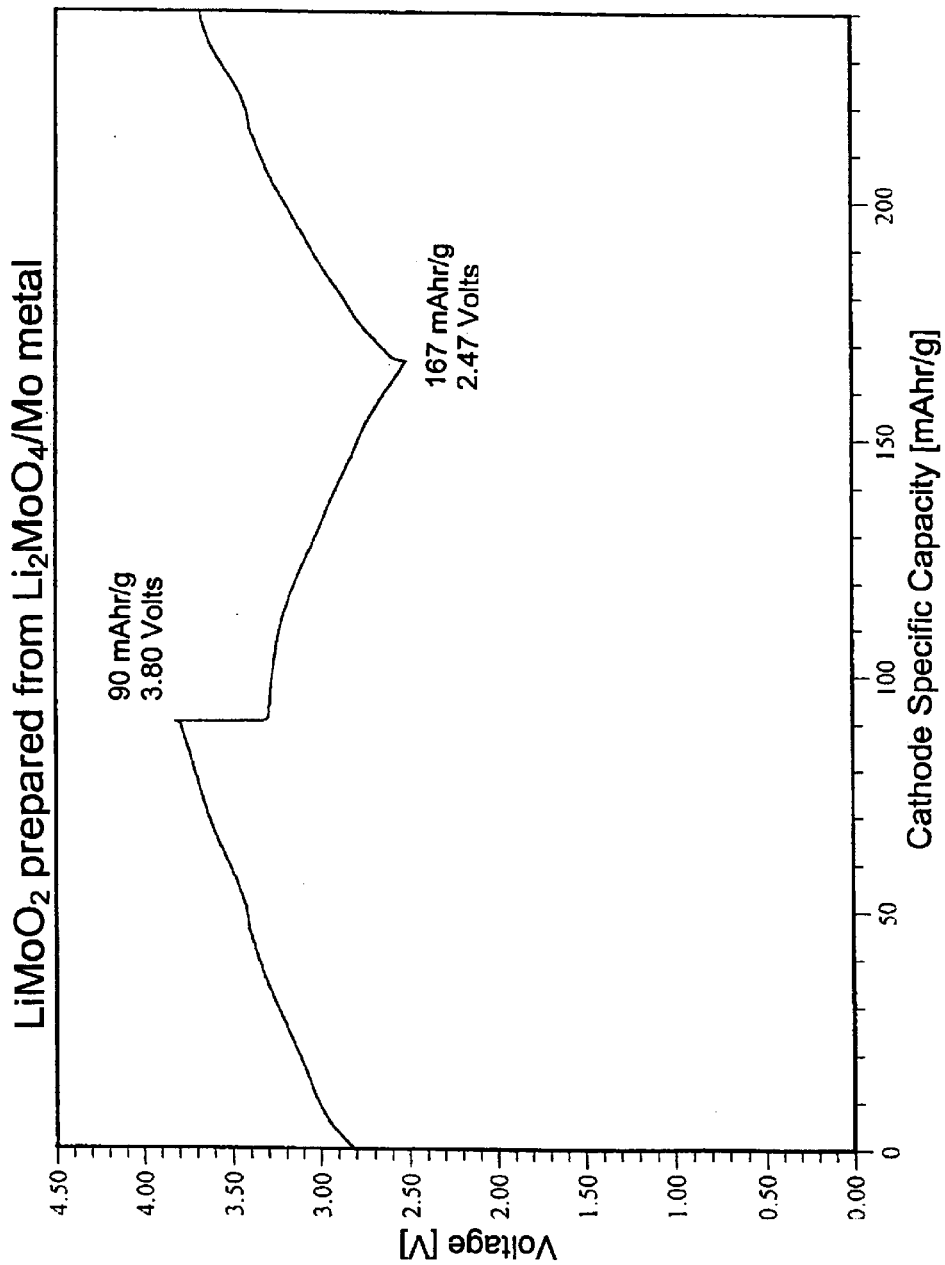
FIG. 22 is current cycling data for $LiMoO_2$ made from $Li_2MoO_4$ and Mo.

FIG. 22 (Cell#908039) shows the results of the first constant current cycling using a lithium metal counter electrode at 0.2 mA/cm$^2$ between 2.50 and 3.80 V based upon the 14.5 mg of the $LiMoO_2$ active material of Example 8 in the positive electrode. The testing was carried out at 23° C. The initial measured open circuit voltage (OCV) was approx. 2.85 V vs. Li. Lithium is extracted from the $LiMoO_2$ during charging of the cell. A charge equivalent to a material specific capacity of 90 mAh/g is extracted from the cell. The theoretical specific capacity for $LiMoO_2$ (assuming all the lithium is extracted) is 199 mAh/g. Consequently, the positive electrode active material corresponds to $Li_{1-x}MoO_2$ where x equates to about 0.45, when the active material is charged to about 3.80 V vs. Li. When the cell is discharged to approx. 2.50 V a quantity of lithium is re-inserted into the $Li_{1-x}MoO_2$. The re-insertion process corresponds to approximately 77 mAh/g. This demonstrates the reversibility of this $LiMoO_2$ material. At 2.50 V the positive active material corresponds to approximately $Li_{0.94}MoO_2$. The generally symmetrical nature of the charge-discharge curves further indicates the reversibility of the system.

In Example 11, $Li_4Mo_3O_8$ was prepared from 7.840 g of $Li_2MoO_4$ (Alfa-Aesar) and 2.700 g of Mo metal (Alfa-Aesar). This corresponds to a 25% weight excess of Mo over the stoichiometric reaction. The reaction was carried out first at 700° C. for 4 h, and second at 750° C. for 4 h, both under an argon atmosphere. The product compound appeared black in color and had excellent uniformity. Based on the excess Mo used, this product probably also contained a low level of the metal as an impurity. The product was placed in an argon-filled glove box immediately following the preparative stage.

Figure 23:
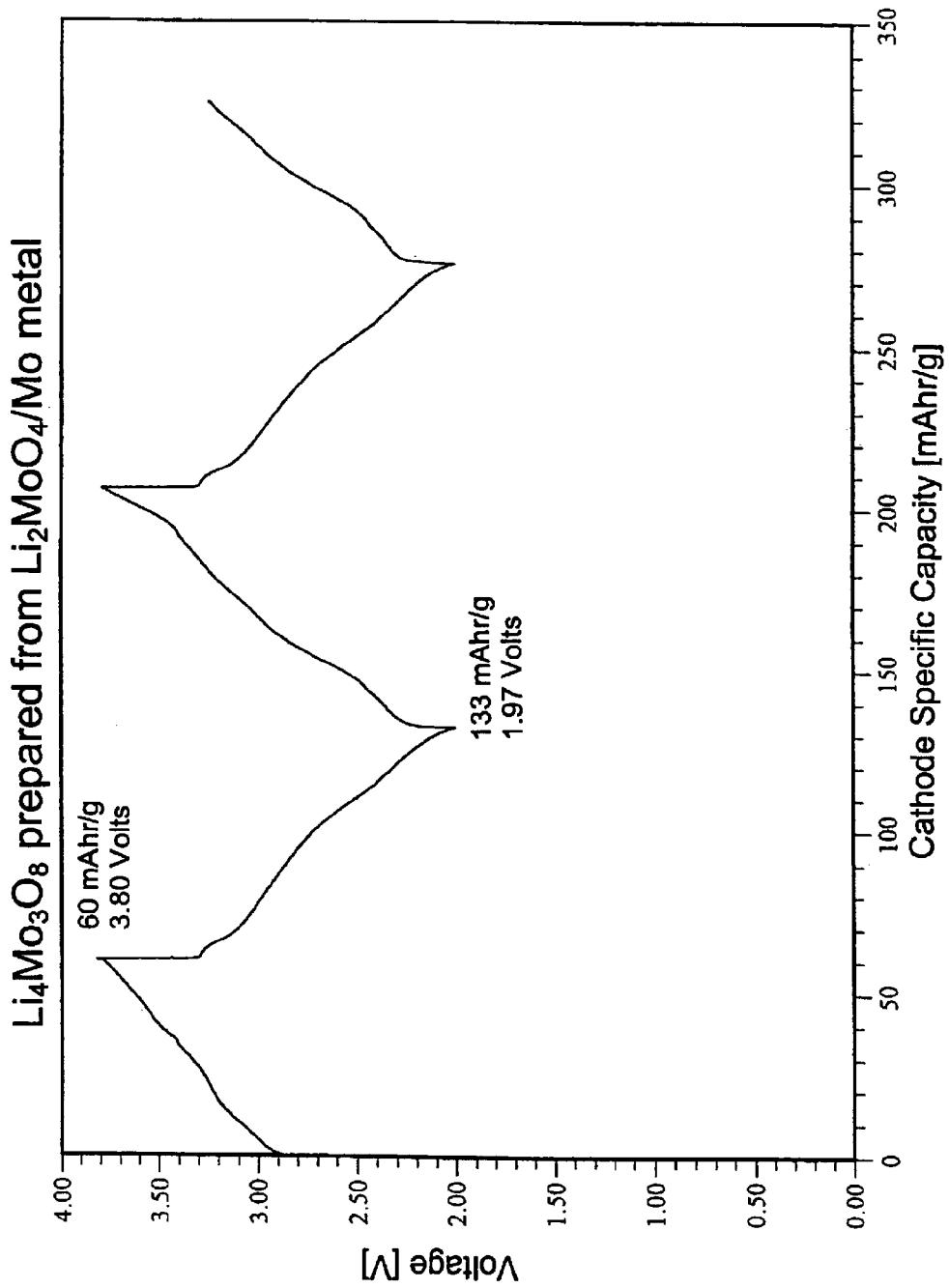
FIG. 23 is current cycling data for $Li_4Mo_3O_8$ made from $Li_2MoO_4$ and Mo.

FIG. 23 (Cell#908122) shows the results of the first constant current cycling using a lithium metal counter electrode at 0.2 mA/cm$^2$ between 2.00 and 3.80 V based upon the 10.2 mg of the $Li_4Mo_3O_8$ active material in the positive electrode. The testing was carried out at 23° C. The initial measured open circuit voltage (OCV) was approx. 2.88 V vs. Li. Lithium is extracted from the $Li_4Mo_3O_8$ during charging of the cell. A charge equivalent to a material specific capacity of 60 mAh/g is extracted from the cell. The theoretical specific capacity for $Li_4Mo_3O_8$ (assuming all the lithium is extracted) is 242 mAh/g. Consequently, the positive electrode active material corresponds to $Li_{4-x}Mo_3O_8$ where x equates to about 1.00, when the active material is charged to about 3.80 V vs. Li. When the cell is discharged to approx. 2.00 V a quantity of lithium is re-inserted into the $Li_{4-x}Mo_3O_8$. The re-insertion process corresponds to approximately 73 mAh/g. This demonstrates the reversibility of this $Li_4MoO_8$ material. At 2.00 V the positive active material corresponds to approximately $Li_{4.24}MoO_2$. The generally symmetrical nature of the charge-discharge curves further indicates the reversibility of the system.

Long Term Cycling

Longer term cycling in lithium metal cells of some of the lithium molybdenum oxide iterations was undertaken on a commercial Maccor Inc. Battery Cycler. The constant current cycling of the cells was carried out between preset voltage limits of 2.00 and 3.60 V at 23° C. The current density for cell charge and discharge was set, such that a single discharge reaction (lithium insertion) took approximately 12 hours to complete i.e. a C/12 rate.

Figure 24:
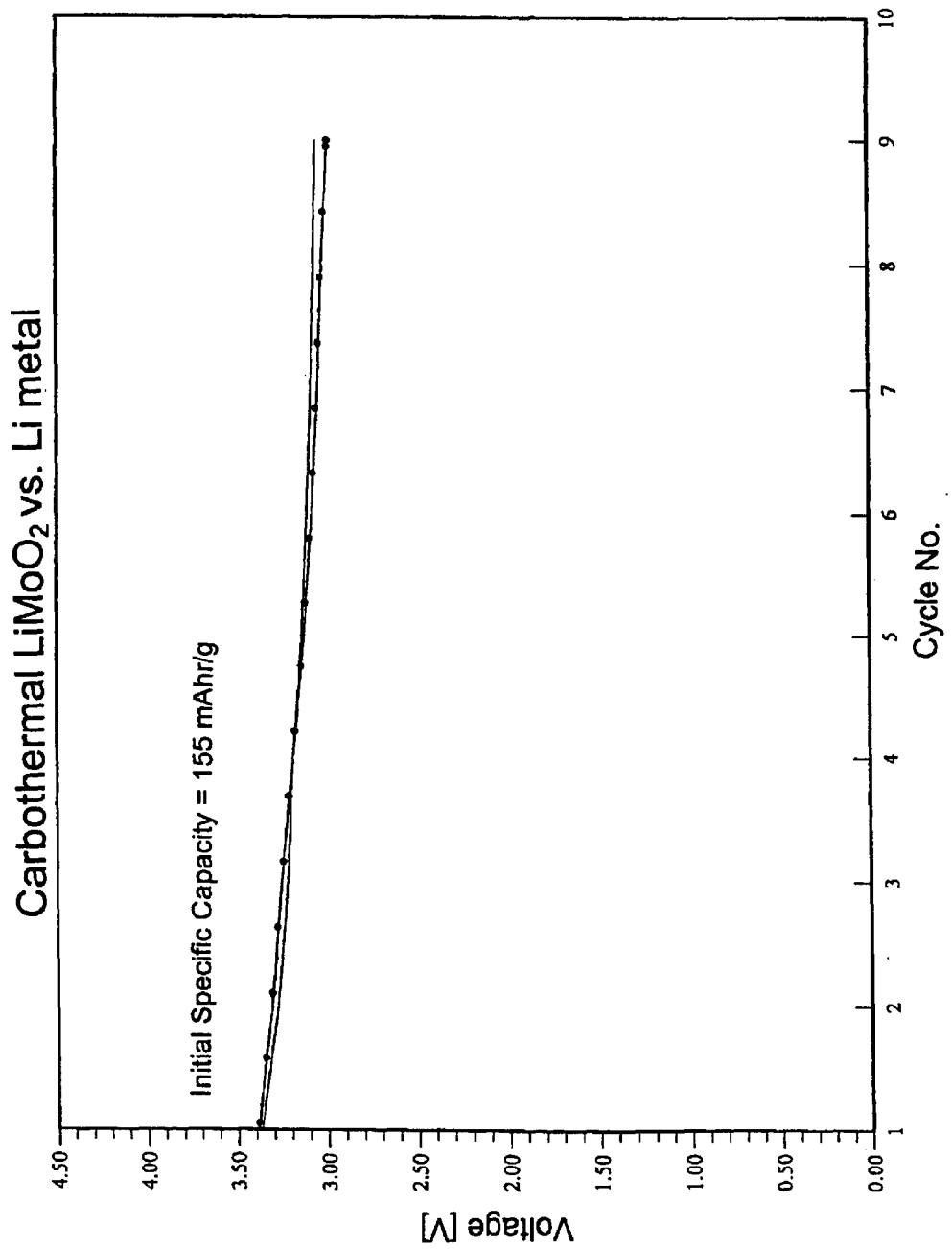
FIG. 24 is cycling behavior of cells with $LiMoO_2$ as positive electrode active material.

FIG. 24 depicts the cycling behavior of two lithium cells using a single carbothermally prepared $LiMoO_2$ iteration (Example 4) as the positive active material. Based on the weight of cathode material used, the initial cathode specific capacity in each cell may be estimated at about 155 mAh/g. Over the 9 cycles shown the cells show good capacity retention with only a small loss of capacity.

Figure 25:
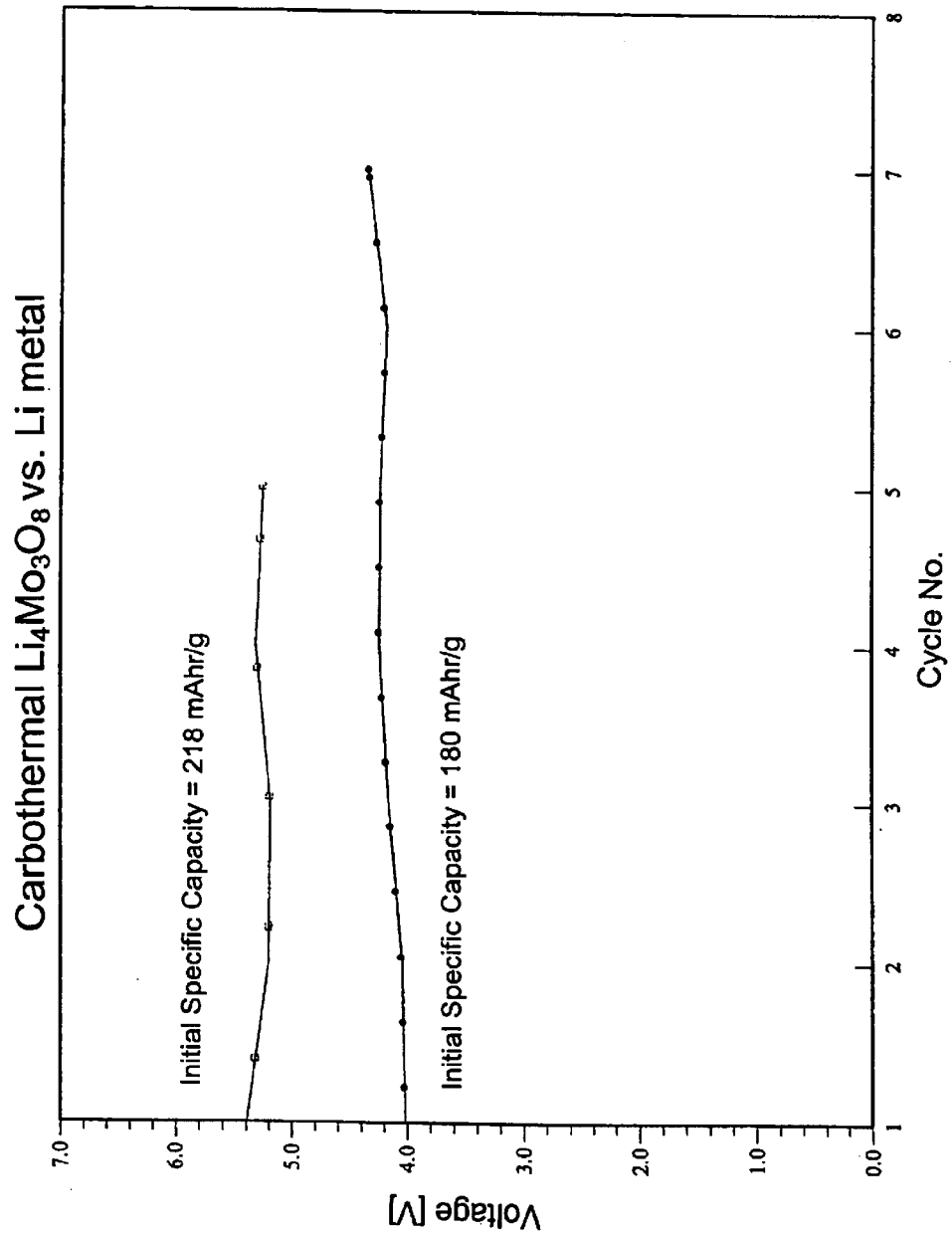
FIG. 25 is cycling behavior of cells with carbothermally prepared $Li_4Mo_3O_8$.

The cycling performance of the carbothermally prepared $Li_4Mo_3O_8$ (Example 7) is shown in FIG. 25. Two lithium cells are shown. In the first cell (Cell#M008180A) the initial specific capacity was 218 mAh/g, and in the second 180 mAh/g. Over the limited number of cycles shown, each of the cells shows good capacity retention.

Lithium Ion Testing

Lithium ion cells comprise an anode, cathode and an electrolyte. The cells were constructed using either a $LiMoO_2$ (Preparative Example 4) or a $Li_4Mo_3O_8$ (Preparative Example 7) cathode active material. In lithium ion configuration the active materials were cycled versus a suitably capacity balanced MCMB-2528 anode electrode. The cells were tested using the Electrochemical Voltage Spectroscopy (EVS) technique.

Figure 26:
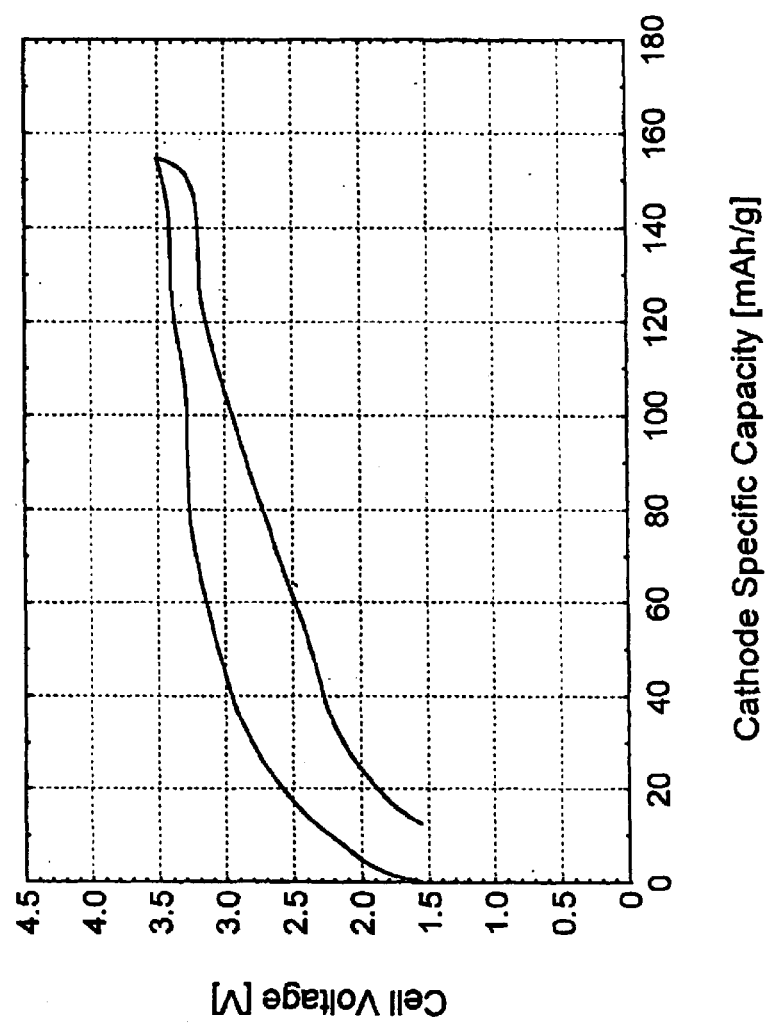
FIG. 26 is voltage-capacity response for a $LiMoO_2$ lithium ion cell.
Figure 27:
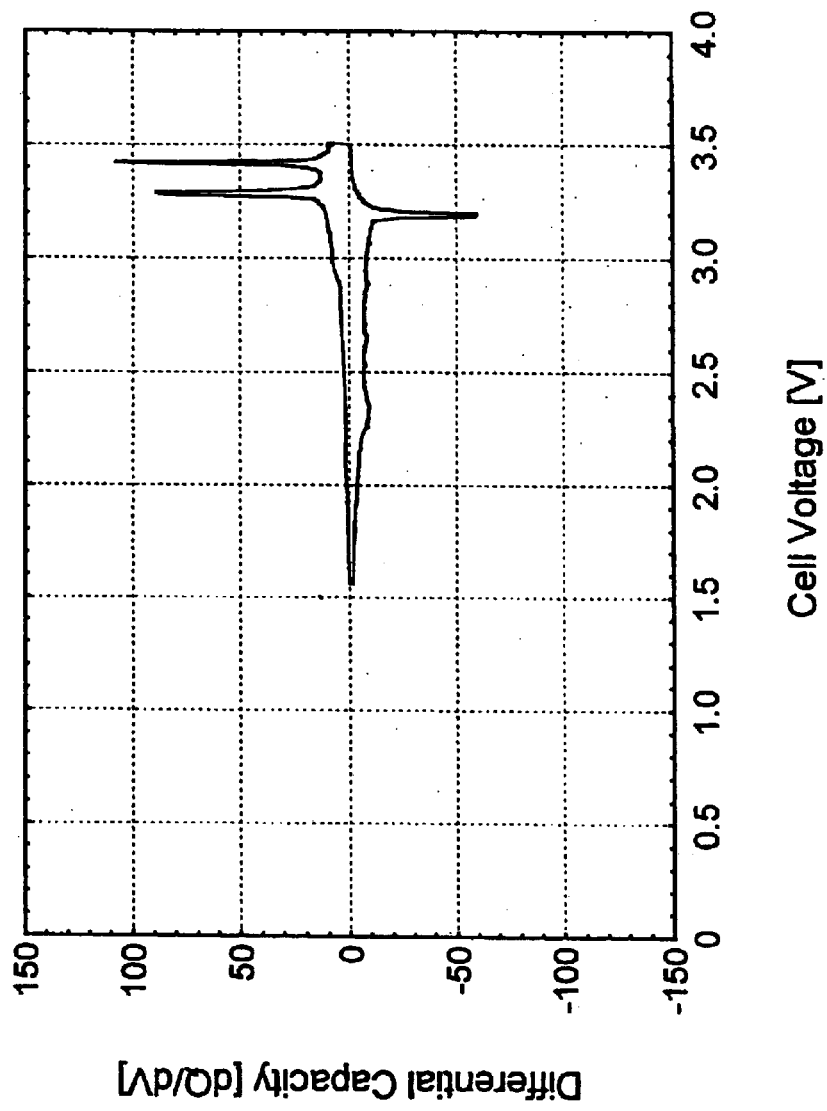
FIG. 27 is differential capacity data for a $LiMoO_2$ lithium ion cell.

FIG. 26 shows the first cycle EVS voltage-capacity response for a $LiMoO_2$-MCMB-2528 lithium ion cell. The cell (cell#008099) comprised 21.9 mg active $LiMoO_2$ and 10.5 mg active MCMB-2528 for a cathode to anode mass ratio of 2.09:1. The cell was charged and discharged at 23° C. at an approximate C/10 (10 hour) rate between voltage limits of 1.50 V and 3.50 V. FIG. 26 shows the variation in cell voltage versus cathode specific capacity for the $LiMoO_2$-MCMB-2528 lithium ion cell. The cathode active material shows a reversible specific capacity of over 140 mAh/g, and the first cycle capacity loss is less than 9%. The MCMB2528 reversibly cycles at approximately 293 mAh/g. FIG. 27 shows the corresponding EVS differential capacity data for the $LiMoO_2$-MCMB-2528 lithium ion cell and demonstrate the reversibility of the system.

Figure 28:
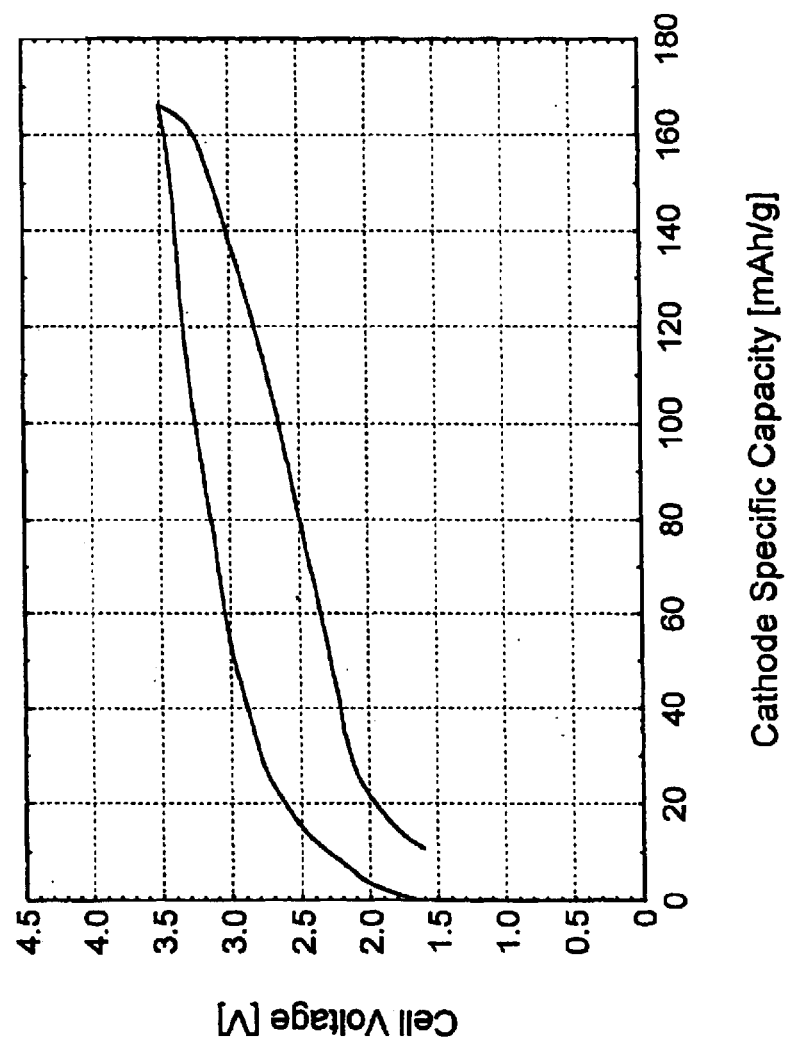
FIG. 28 is a voltage-capacity response for a $Li_4Mo_3O_8$ lithium ion cell.
Figure 29:
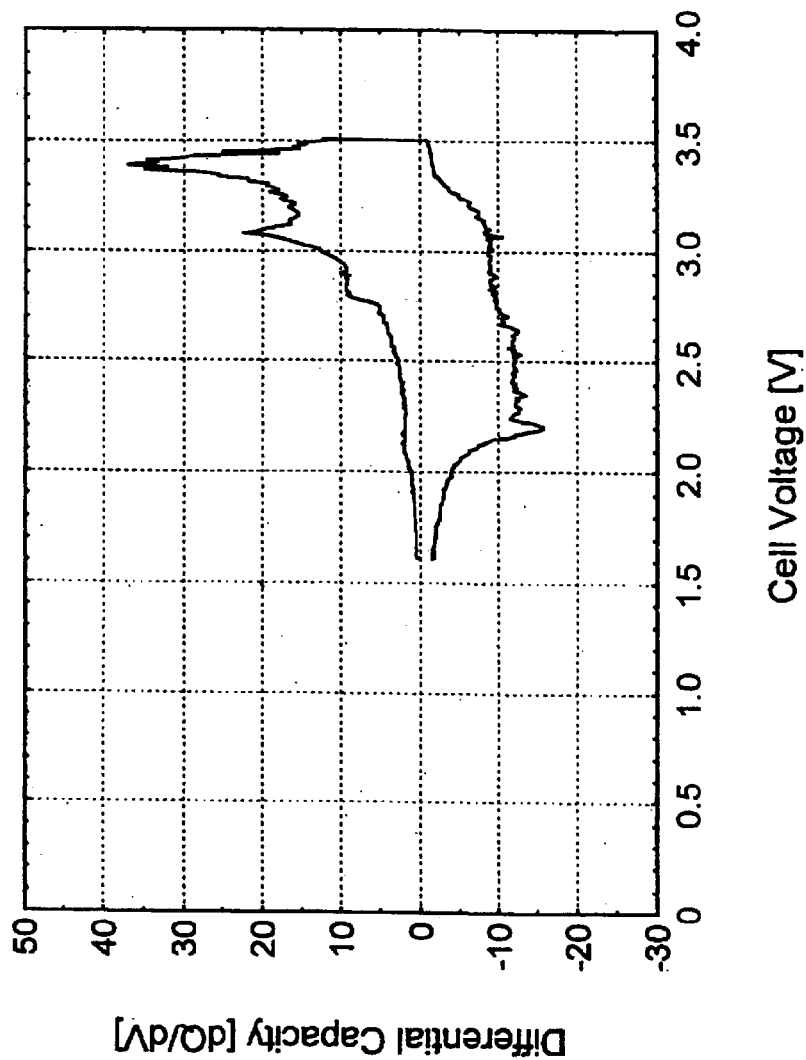
FIG. 29 is a differential capacity data for a $Li_4Mo_3O_8$ lithium ion cell.

The first cycle EVS data for a $Li_4Mo_3O_8$-MCMB-2528 lithium ion cell are shown in FIGS. 28 and 29. The cell (cell#008162) comprised 18.9 mg active $Li_4Mo_3O_8$ and 10.6 mg active MCMB-2528 for a cathode to anode mass ratio of 1.78:1. The cell was charged and discharged at 23° C. at an approximate C/10 (10 hour) rate between voltage limits of 1.55 V and 3.50 V. FIG. 28 shows the variation in cell voltage versus cathode specific capacity for the $Li_4Mo_3O_8$-MCMB-2528 lithium ion cell. The cathode active material shows a reversible specific capacity of over 155 mAh/g, and the first cycle capacity loss is less than 7%. The MCMB2528 reversibly cycles at approximately 276 mAh/g. In common with the $LiMoO_2$-MCMB-2528 lithium ion cell, this is very good electrochemical performance. The differential capacity profile shown in FIG. 29 illustrates the reversibility of the system.

We claim:

1. A battery, comprising:
 a positive electrode comprising an electrode active material represented by the formula

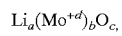

wherein:
 (a) d is an average oxidation state of molybdenum and the variables a, b, c and d are selected so as to satisfy the equation a+bd=2c,
 (b) the electrode active material is a reaction product of a reaction of a lithium source with a molybdenum source in the presence of reducing carbon, and
 (c) excess reducing carbon is dispersed throughout the reaction product;
 the battery further comprising a negative electrode; and an electrolyte.

2. The battery of claim 1, wherein the electrode active material has a crystal structure belonging to the hexagonal space group.

3. The battery of claim 1, wherein the reducing carbon is elemental carbon.

4. The battery of claim 1, wherein d is from 3 to 5.

5. The battery of claim 1, wherein d is 4.

6. The battery of claim 1, wherein d is 3.

7. The battery of claim 1, wherein d is from 3 to 3.7.

8. The battery of claim 1, wherein the electrode active material is represented by the formula $Li_xMoO_2$, wherein x is greater than 0 and less than 2.

9. The battery of claim 1, wherein the electrode active material is represented by the fomiula $Li_4Mo_3O_8$.

10. The battery of claim 1, wherein the reducing carbon is formed in situ from an organic material upon beating.

11. The battery of claim 1, wherein the negative electrode comprises graphite.

12. The battery of claim 8, wherein x is from about 0.3 to 1.2.

13. The battery of claim 8, wherein x is 1.

14. The battery of claim 10, wherein the organic material is selected from the group consisting of glycerol, mineral oils, cokes, coal tars, and starch.

15. The battery of claim 11, wherein the electrolyte comprises a solvent selected from the group consisting of dimethyl carbonate, diethyl carbonate, dipropylcarbonate, ethyl methyl carbonate, ethylene carbonate, propylene carbonate, butylene carbonate, a glyme, a lactone, an ester, a sulfoxide, a sulfonane, and mixtures thereof.

* * * * *

UNITED STATES PATENT AND TRADEMARK OFFICE
CERTIFICATE OF CORRECTION

PATENT NO.   : 6,908,710 B2
DATED        : June 21, 2005
INVENTOR(S)  : Jeremy Barker, M. Yazid Saidi and Jeffrey Swoyer It is certified that error appears in the above-identified patent and that said Letters Patent is hereby corrected as shown below:

Column 28,
Line 40, delete "beating" and insert -- heating -- therefor.

Signed and Sealed this

Sixteenth Day of August, 2005

JON W. DUDAS
*Director of the United States Patent and Trademark Office*